US012585118B2

(12) United States Patent
Poon et al.

(10) Patent No.: US 12,585,118 B2
(45) Date of Patent: Mar. 24, 2026

(54) WAVEGUIDE COMBINER WITH REDUCED LIGHT LEAKAGE

(71) Applicant: Microsoft Technology Licensing, LLC, Redmond, WA (US)

(72) Inventors: Yarn Chee Poon, Sammamish, WA (US); Mark T. Bolas, Redmond, WA (US); Ishan Chatterjee, Redmond, WA (US); Bernard C. Kress, Redwood City, CA (US); Yifei Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 352 days.

(21) Appl. No.: 18/326,484

(22) Filed: May 31, 2023

(65) Prior Publication Data

US 2024/0402493 A1    Dec. 5, 2024

(51) Int. Cl.
G02B 27/01        (2006.01)

(52) U.S. Cl.
CPC ..................... G02B 27/0172 (2013.01); *G02B 2027/0112* (2013.01)

(58) Field of Classification Search
CPC ................ G02B 27/0172; G02B 27/01; G02B 27/0101; G02B 27/283; G02B 27/017; G02B 2027/0112; G02B 2027/0178
See application file for complete search history.

(56) References Cited

U.S. PATENT DOCUMENTS

| | | | |
|---|---|---|---|
| 10,725,302 B1 | 7/2020 | Sharma | |
| 11,609,441 B1 | 3/2023 | Rodriguez, II | |
| 11,635,624 B1 | 4/2023 | Amirsolaimani | |
| 11,899,214 B1 * | 2/2024 | Petrov ................... | G06T 19/006 |

(Continued)

FOREIGN PATENT DOCUMENTS

| | | |
|---|---|---|
| CN | 116088086 A | 5/2023 |
| WO | 2022038400 A1 | 2/2022 |
| WO | 2022150630 A1 | 7/2022 |

OTHER PUBLICATIONS

International Search Report and Written Opinion received for PCT Application No. PCT/US2024/026932, mailed on Jul. 19, 2024, 15 pages.

*Primary Examiner* — Thomas A Hollweg
*Assistant Examiner* — Mary A El-Shammaa
(74) *Attorney, Agent, or Firm* — Michael T. Abramson; Jordan IP Law, LLC

(57) ABSTRACT

Optical filters are disclosed for reducing leakage of light used for virtual images from a mixed-reality head-mounted display (HMD) device having a waveguide combiner. The optical filters include spectral-sensitive wideband and narrowband reflectors comprising triple-notch filters or single-notch filters that reflect forward-propagating virtual image light back to a user's eyes. The optical filters further include light deflectors having planar and curved configurations comprising volume Bragg gratings (VBGs), liquid crystal Bragg gratings, and partially-reflective mirror arrays. A light deflector steers forward-propagating virtual image light to (Continued)

- - - - - - - - - ▶ Blue virtual image light (3605)
———————▶ Green virtual image light (3610)
— — — — — ▶ Red virtual image light (3615)

Visor (3602)

100

115

115 y z x

Elements in the drawing are not to scale

Visor (3602)    Extension

Eye side (1504)    Real-world side (1502)

3605

3610

3615

3305

Output coupler (1625)    Light deflector (3600)

impart an angular change in propagation direction. The steered light is absorbed and/or diffused by structures in the HMD device and/or deflected to prevent the outward appearance of virtual image overlay with the HMD device user's eyes.

20 Claims, 32 Drawing Sheets

(56) References Cited

U.S. PATENT DOCUMENTS

| | | | |
|---|---|---|---|
| 12,093,453 B2 * | 9/2024 | Border | ............... G02B 27/0179 |
| 2019/0258061 A1 * | 8/2019 | Solomon | ............ G02B 27/0172 |
| 2021/0271089 A1 | 9/2021 | Wheelwright | |
| 2022/0128744 A1 | 4/2022 | Bohn | |
| 2022/0187599 A1 | 6/2022 | Lee | |
| 2022/0300073 A1 | 9/2022 | Reshidko et al. | |
| 2022/0390744 A1 | 12/2022 | Alasaarela | |
| 2023/0101762 A1 | 3/2023 | Han | |
| 2025/0085544 A1 * | 3/2025 | May | ................... G02B 27/0093 |

* cited by examiner

Turn right in 20 meters

Arc Café

Elements in the drawing are not to scale

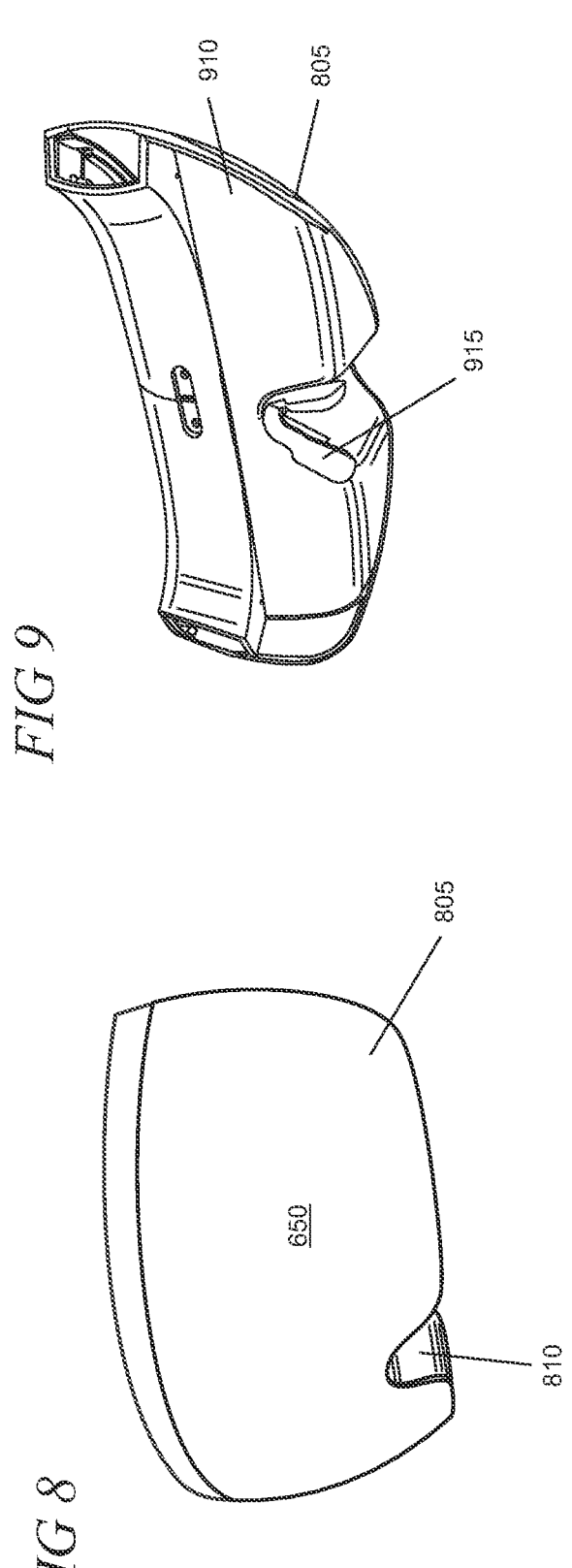
*FIG 8*
*FIG 9*
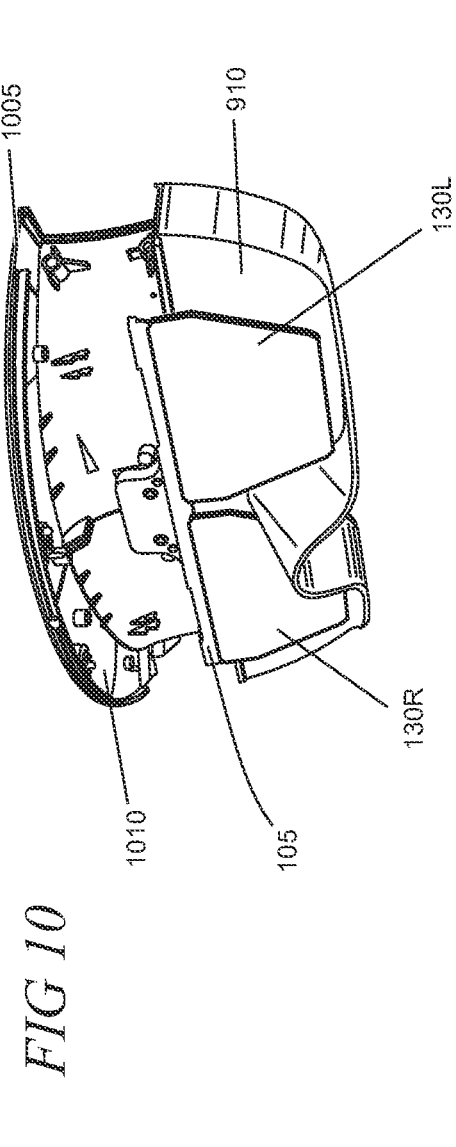
*FIG 10*

105

130

Elements in the drawing
are not to scale

130

Blue virtual image light (1505)

Green virtual image light (1510)

Red virtual image light (1515)

Input coupler (1520)

Intermediate coupler (1525)

Real-world side (1502)

Output coupler (1530)

Display engine

125

Eye side (1504)

115

Elements in the drawing are not to scale

130

Display engine (125)

Input coupler (1615)

Intermediate coupler (1620)

Real-world side (1502)

Eye side (1504)

Positive (conjugate) lens (1610)

Light from real-world objects

1602

Output coupler (1625)

Collimated rays (1635)

Negative lens (1605)

Divergent virtual image light rays (1642)

205

1640

F d

115

Elements in the drawing are not to scale

130

Rearward propagating virtual image light (1710)
Forward propagating virtual image light (1715)

Real-world side (1502)

1715

Input coupler (1615)

1705

Intermediate coupler (1620)

Eye side (1504)

Output coupler (1625)

Display engine
125

1710

115 z
y
x

Elements in the drawing are not to scale

130

1900

2000

2100

2200

2300

130

Waveguide (205)

Spectral-sensitive reflector (1800)

Adhesive (2605)

*Elements in the drawing are not to scale*

130

Real-world side (1502)

Positive lens

1610

2700

205

Input coupler (1615)

Intermediate coupler (1620)

Eye side (1504)

Output coupler (1625)

1605

Negative lens

115

Elements in the drawing are not to scale

100

Visor (1010)

Light deflector (3300)

3305

205 z
y
x

*Elements in the drawing are not to scale*

100

Visor (1010)

Light deflector (3200)

650

205 z
y
x

*Elements in the drawing are not to scale*

100

100

Blue virtual image light (3505)

Green virtual image light (3510)

Red virtual image light (3515)

Real-world side (1502)

650

Visor (1010)

130

Light deflector (3500)

Eye side (1504)

3505

3510

3515

Output coupler (1625)

115 z
y
x

Elements in the drawing are not to scale

Elements in the drawing
are not to scale

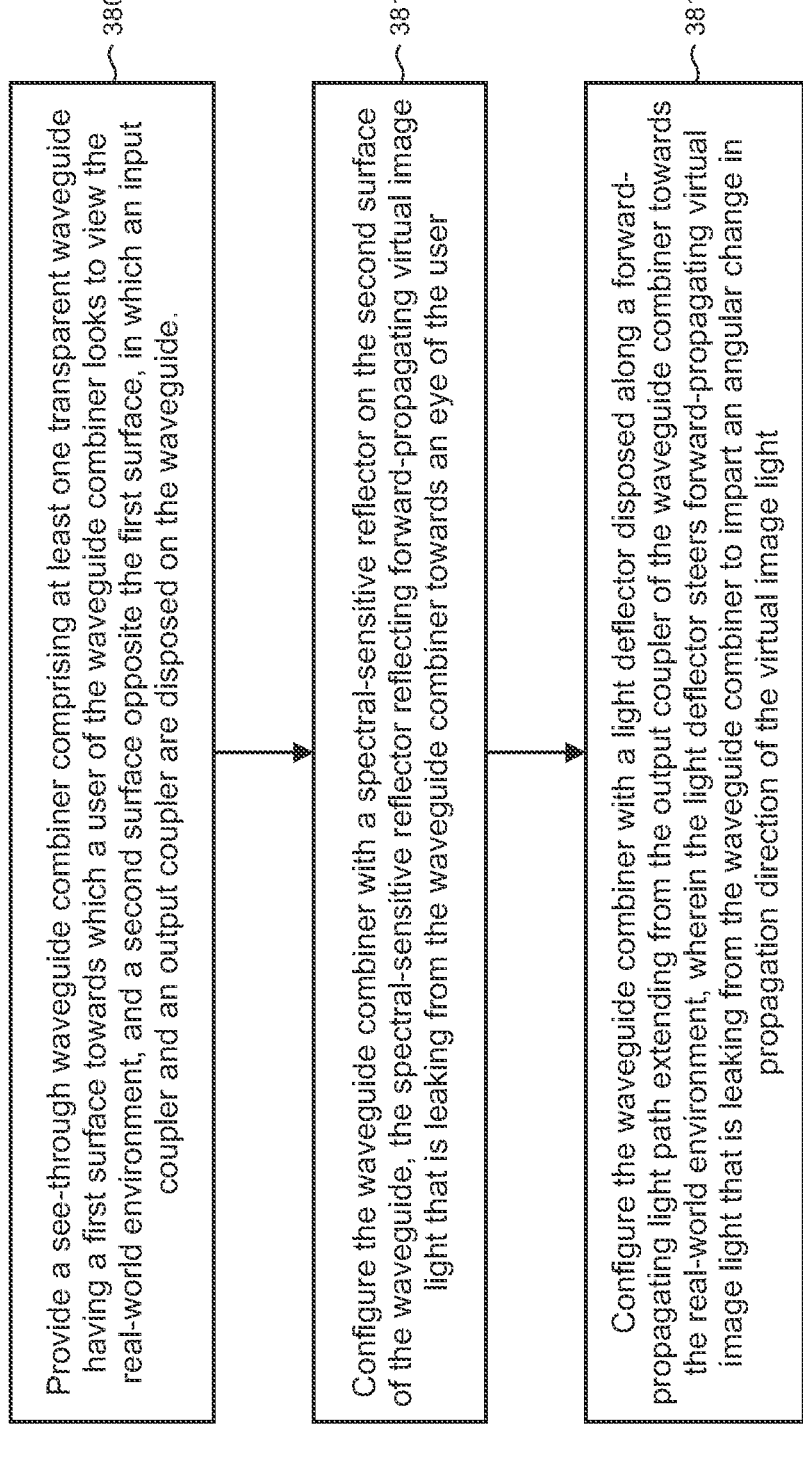

Provide a see-through waveguide combiner comprising at least one transparent waveguide having a first surface towards which a user of the waveguide combiner looks to view the real-world environment, and a second surface opposite the first surface, in which an input coupler and an output coupler are disposed on the waveguide.

3805

Configure the waveguide combiner with a spectral-sensitive reflector on the second surface of the waveguide, the spectral-sensitive reflector reflecting forward-propagating virtual image light that is leaking from the waveguide combiner towards an eye of the user

3810

Configure the waveguide combiner with a light deflector disposed along a forward-propagating light path extending from the output coupler of the waveguide combiner towards the real-world environment, wherein the light deflector steers forward-propagating virtual image light that is leaking from the waveguide combiner to impart an angular change in propagation direction of the virtual image light

3815

WAVEGUIDE COMBINER WITH REDUCED LIGHT LEAKAGE

BACKGROUND

Mixed-reality computing devices, such as head-mounted display (HMD) systems and handheld mobile devices (e.g., smart phones, tablet computers, etc.), may be configured to display virtual objects using virtual images, and/or real objects in a field of view (FOV) of an HMD device user and/or a field of view of a camera of the device. For example, an HMD device may be configured to display, using a see-through display system, virtual environments with real-world objects mixed in, or real-world environments with virtual objects mixed in.

SUMMARY

A waveguide combiner includes at least one see-through waveguide through which a user sees the real world. An optical input coupler and output coupler are disposed on the waveguide and respectively arranged to in-couple light for virtual images generated by a display engine and out-couple the virtual images over the real-world views to an eye of the user. Optical filters including a spectral-sensitive reflector and/or a light deflector are utilized to reduce light that leaks from the waveguide combiner and propagates forwards in the direction of the real-world side of the waveguide.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 8 shows a pictorial front view of an illustrative eye shield used as a component of an HMD device;

FIG. 9 shows a pictorial rear view of an illustrative eye shield;

FIG. 10 shows a partially disassembled view of an illus-trative eye shield;

Figure 37:
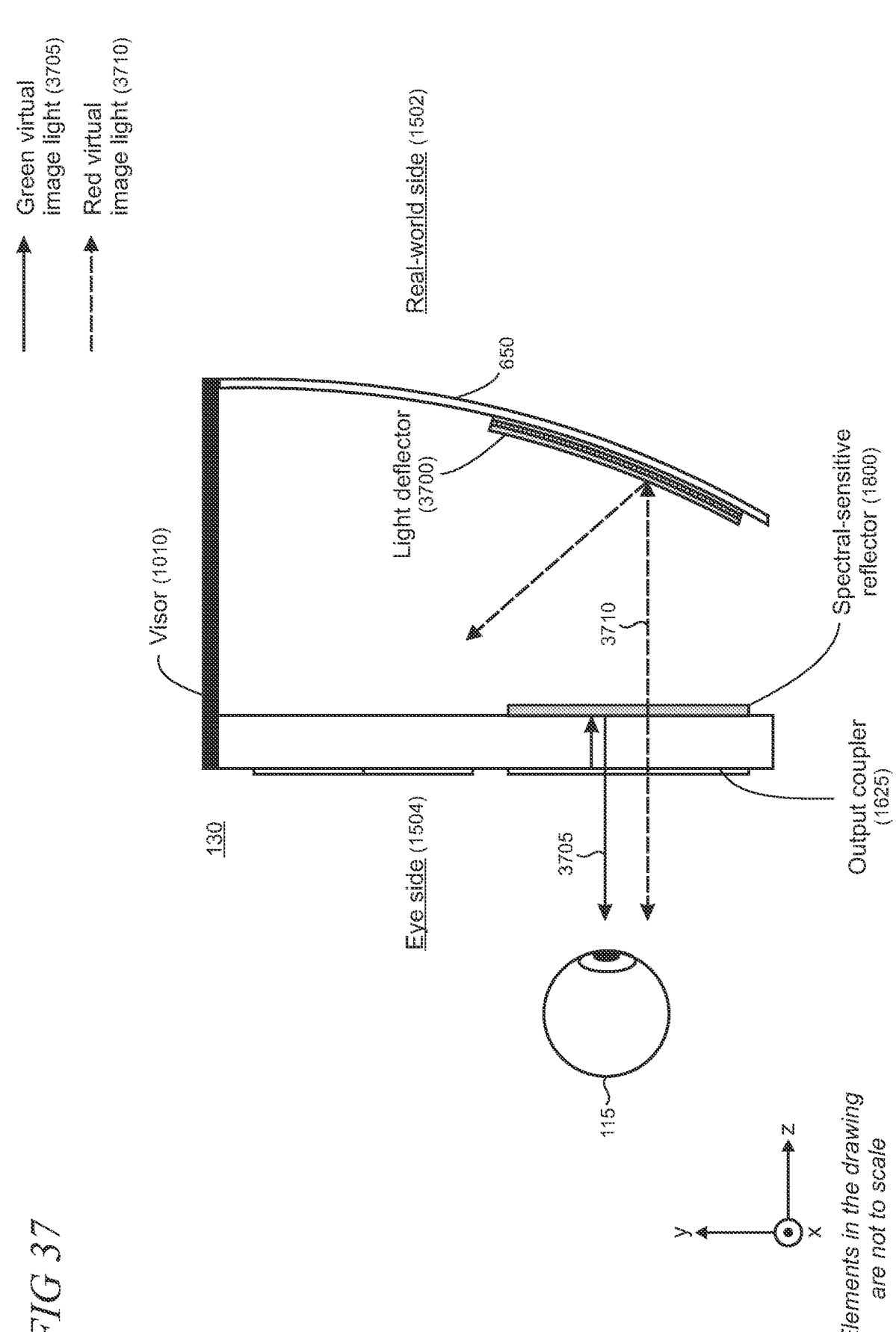
Figure 39:
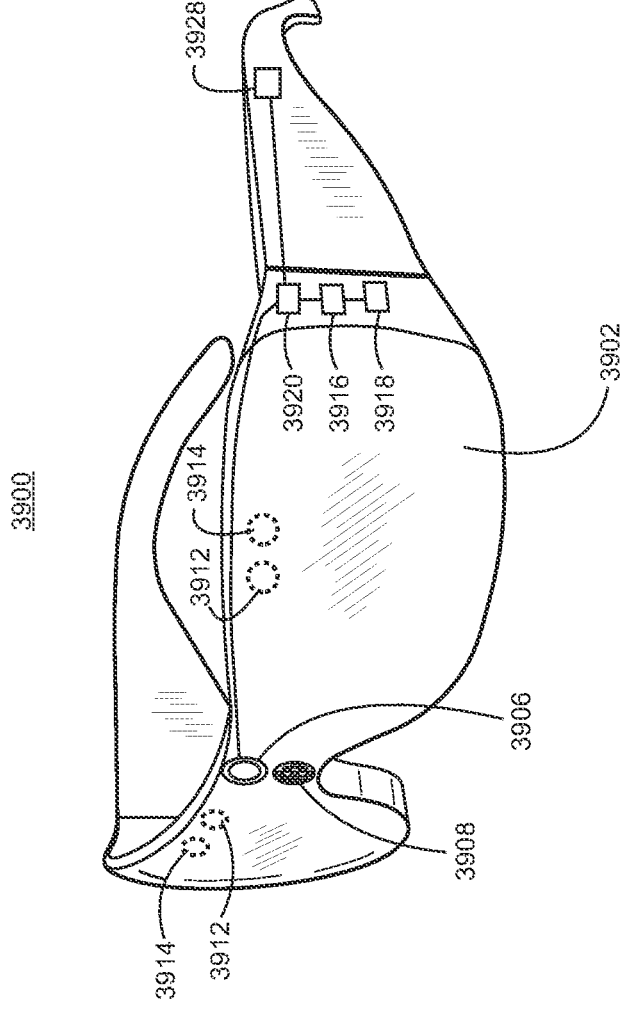
Figure 40:
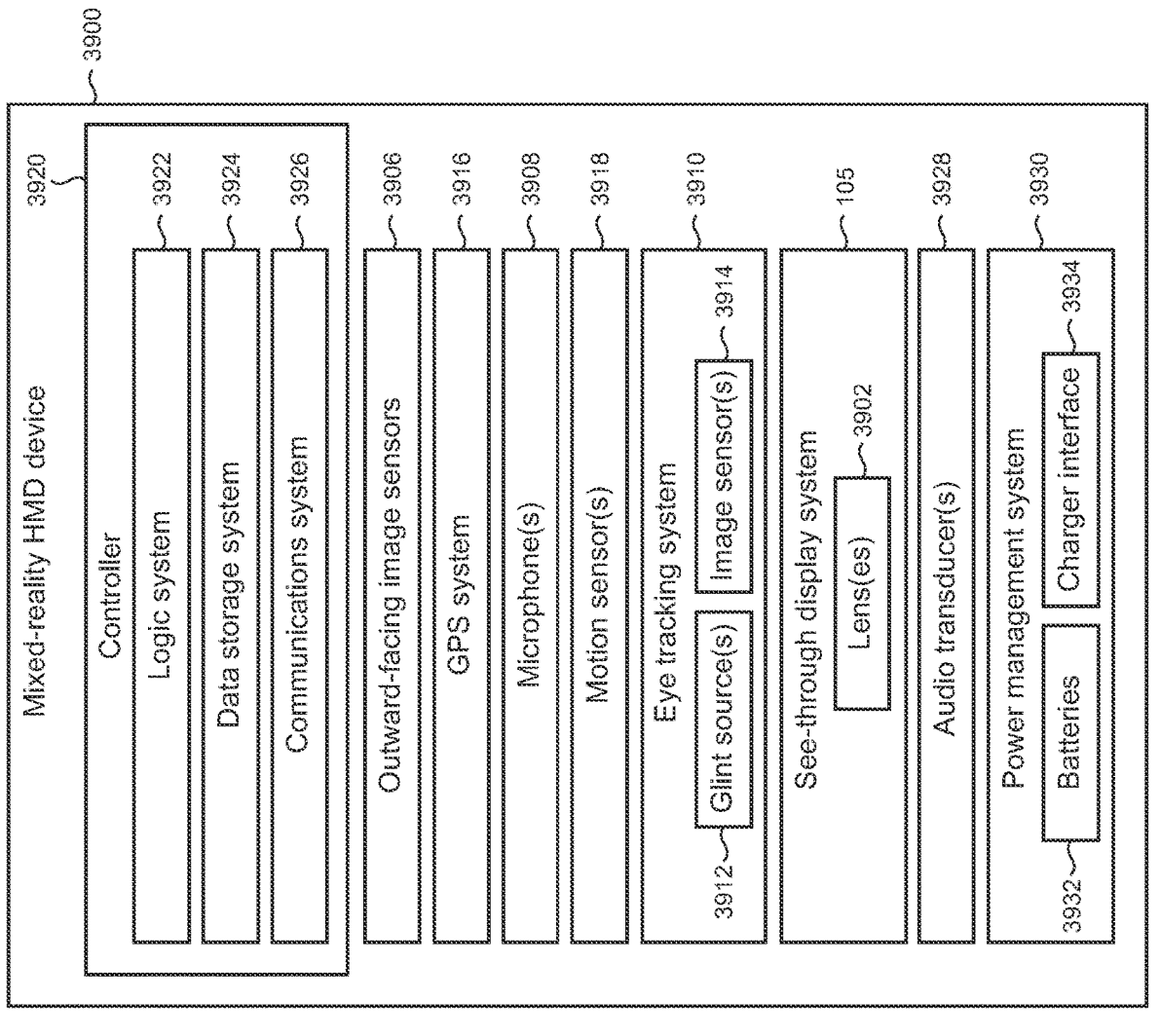
Figure 41:
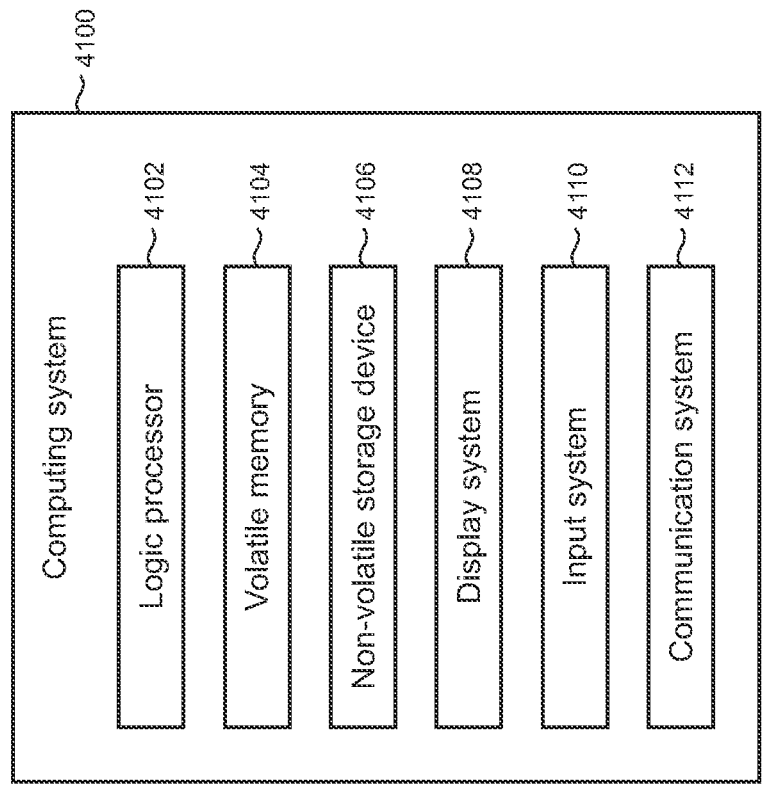

FIG. 37 is a pictorial side view of a portion of an HMD device showing an illustrative embodiment in which a spectral-sensitive reflector is located adjacent to a waveguide combiner and a light deflector is located adjacent to an eye shield;

FIG. 38 is a flowchart of an illustrative method;

FIG. 39 is a pictorial view of an illustrative example of a virtual-reality or mixed-reality HMD device that is configurable to use the present waveguide combiner with reduced light leakage;

FIG. 40 shows a block diagram of an illustrative example of a virtual reality or mixed-reality HMD device that is configurable to use the present waveguide combiner with reduced light leakage; and FIG. 41 shows a block diagram of an illustrative electronic device that incorporates a mixed-reality display system using the present waveguide combiner with reduced light leakage.

Like reference numerals indicate like elements in the drawings. Elements are not drawn to scale in the drawings.

DETAILED DESCRIPTION

Light for virtual images in mixed-reality environments that combine images of virtual objects with views of the real world can leak from HMD (head-mounted display) and other electronic devices that employ waveguide combiners having optical couplers. Such light is typically considered wasted because it is not used to display virtual images to a device user and thus an energy cost is imposed which is typically undesirable for battery-powered devices. Light leaking from the waveguide combiner that propagates in a forward direction towards the real-world side of the device (as opposed to the rearward direction towards the eye side of the device) is often manifested as "eye glow" which raises security concerns in some mixed-reality HMD device use cases in which detectability of device users is sought to be minimized. Such forward-propagating virtual image light, sometimes referred to as forward-projecting light, can also overlay a user's eyes when seen by an observer. This phenomenon presents social interaction difficulties between mixed-reality HMD device users by limiting eye contact in some use cases.

Undesirable light leakage is reduced in the present waveguide combiner using optical filters configured to reflect and/or deflect forward-propagating virtual image light. The optical filters include spectral-sensitive reflectors and light deflectors which are usable in a given HMD device individually or in combination. Both the spectral-sensitive reflector and light deflector are configured as passive structures that consume no electrical power.

In illustrative embodiments, a spectral-sensitive reflector is disposed on a backside (i.e., real-world side) of a see-through waveguide combiner to reflect forward-propagating virtual image light back towards the eye side of the combiner and the user's eye. The spectral-sensitive reflector is configurable as a triple-notch filter in which the bandpass matches the display engine output (e.g., polychromatic output using an RGB (red, green, blue) color model). For monochromatic applications, the spectral-sensitive reflector is configurable as a single-notch filter having a bandpass that matches the monochrome virtual images generated by the display engine. The spectral-sensitive reflector is fabricated using thin film reflective coatings disposed on an optical substrate that is attachable to the backside of the waveguide combiner using adhesive around its periphery to ensure uniform alignment that maintains proper parallelism between the filter and the waveguide.

The transmittance and reflectance characteristics of a spectral-sensitive reflector are tuned to provide optimal virtual image display that is balanced against see-through quality for views of the real world. The spectral selectivity of the reflector is typically tuned to closely match the output of the display engine so that mostly virtual image light is reflected while other wavelengths are passed through unaffected. For example, if the display engine uses narrowband illumination sources such as lasers, the spectral-sensitive reflector is tuned with corresponding narrowband illumination notches. Alternatively, wideband illumination sources in the display engine are matched by corresponding wideband notches in the spectral-sensitive reflector.

The spectral-sensitive reflector advantageously enables virtual image light that would otherwise be wasted to be reflected back to the user. This increases brightness of the virtual image display on the waveguide combiner without a concomitant increase in electrical power. In addition, reducing the forward-propagating virtual image light that leaks from the waveguide combiner lowers device and user detectability, particularly, for example, in low-light scenarios where eye glow can present a security risk. Reduction in the forward-propagating virtual image light also improves social interaction among mixed-reality device users by reducing virtual image overlay with a user's eyes to facilitate eye contact.

In illustrative embodiments, a mixed-reality HMD device is configured as a see-through waveguide combiner having an input coupler and an output coupler that respectively in-couple virtual image light from a light engine and out-couple the light to an eye of an HMD device user. Different types of structures are usable for the optical couplers including diffractive, reflective, volume holograms, resonant wavelength gratings, or other suitable technologies (e.g., optical metasurfaces).

In illustrative embodiments, the waveguide combiner incorporates an exit pupil expander (EPE) that provides an exit pupil for the combiner that is expanded, in one or two directions, compared to an entrance pupil provided by the display engine to the combiner. For two-dimensional exit pupil expansion, an additional intermediate coupler is utilized in the waveguide combiner configured to provide one-dimensional expansion in a first direction while the output coupler is configured to provide one-dimensional expansion in a second direction that is orthogonal to the first direction.

The waveguide combiner is alternatively architected to include a single waveguide plate (e.g., a reflective waveguide with suitable couplers) for monochrome and polychromatic virtual image light, or using multiple stacked waveguide plates in which each waveguide plate in the stack propagates a unique color in a color model (e.g., RGB).

In illustrative embodiments, a light deflector is disposed along a forward-propagating light path that extends from the output coupler towards the real world. The light deflector alternatively comprises one of volume Bragg grating (VBG), liquid-crystal Bragg grating, or one or more arrays of partial mirrors disposed in an optical substrate. The light deflector is configured to steer forward-propagating virtual image light by imparting an angular change in propagation direction. The steered light is absorbed and/or diffused by structures in the HMD device and/or deflected to prevent the outward appearance of virtual image overlay with the HMD device user's eyes. This feature improves social interaction among HMD device users by facilitating eye contact while also reducing the detection risk in security-sensitive use scenarios.

Figures 1, 2:
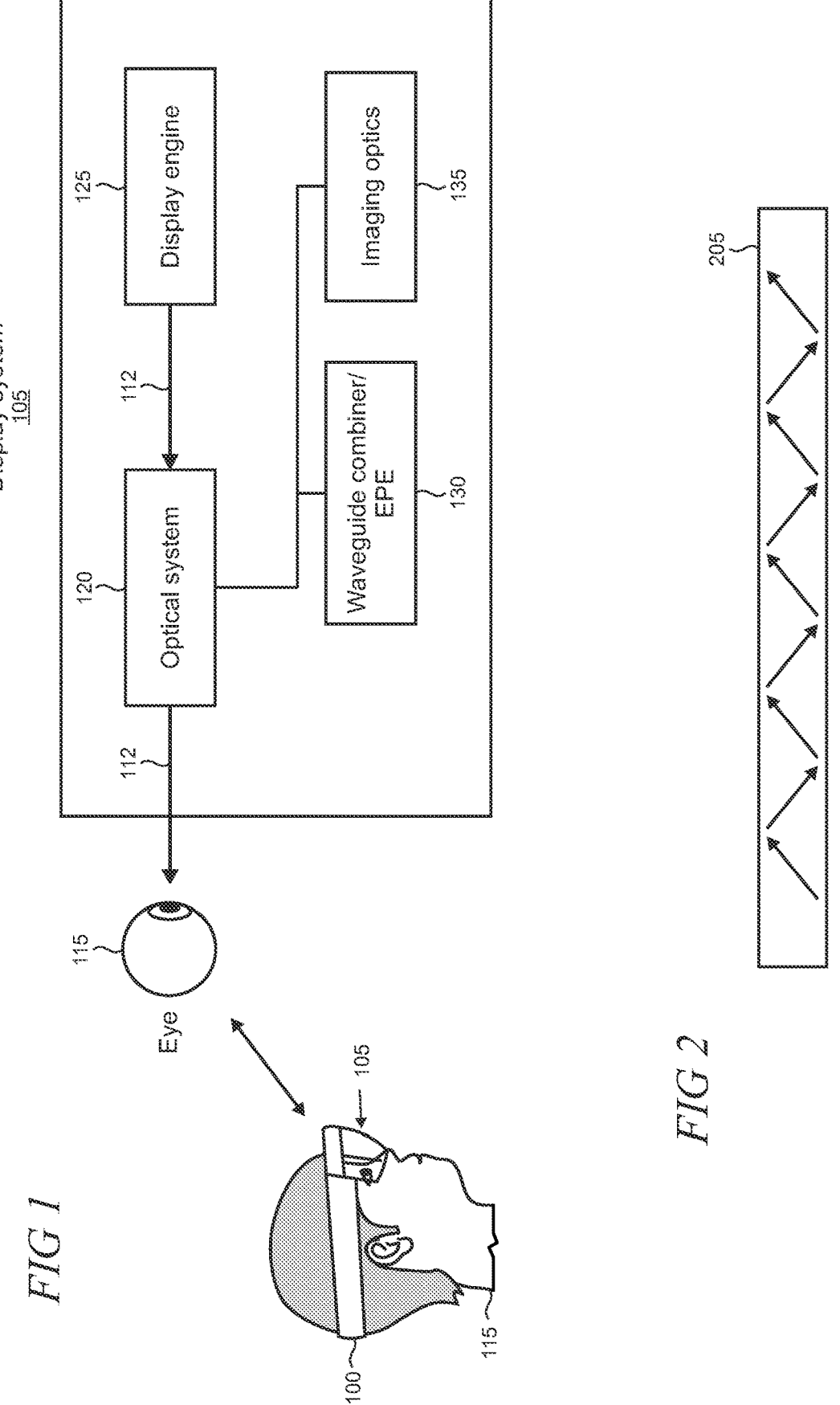
FIG. 1 is a block diagram of an illustrative mixed-reality display system.
FIG. 2 shows propagation of light in a waveguide by total internal reflection (TIR)

Turning now to the drawings, FIG. 1 shows a block diagram of an illustrative display system 105 incorporated into an HMD device 100 that is worn by a user 115. The display system includes a display engine 125 and an optical system 120. The optical system includes a waveguide-based optical combiner (referred to herein as a waveguide combiner 130) and typically includes magnifying and/or colli-mating optical components (referred to herein as imaging optics 135) to provide virtual images and real-world images over a light path 112. In this illustrative example, the waveguide combiner includes exit pupil expander (EPE) functionalities, as described below.

The display engine 125 in the display system 105 is a source of virtual-world objects or holographic images (col-lectively referred to herein as "virtual images") that work with the optical system 120 to deliver virtual images as a display to a user's eye 115. The display engine is configur-able, for example, using RGB (red, green, blue) light emit-ting diodes (LEDs) or lasers, LCOS (liquid crystal on silicon) devices, OLED (organic light emitting diode) arrays, MEMS (micro-electro mechanical system) devices, or any other suitable displays or micro-displays operating in transmission, reflection, or emission. The display engine is further configurable in some cases to include electronics such as processors, optical components such as mirrors and/or lenses, and/or mechanical and other components that enable a virtual display to be composed and to provide optical beams for the virtual images as an input to the optical system.

The display system 105 is configurable as a near-eye display in some applications. Near-eye display systems are often used, for example, in head-mounted display (HMD) devices in industrial, commercial, military, and consumer applications. Other devices and systems also use near-eye display systems, as described below. In a near-eye display system, the display engine does not actually shine the images on a surface such as a glass lens to create the visual display for the user. This is not feasible because the human eye cannot focus on something that is that close. Rather than create a visible image on a surface, the display system uses the optical system 120 to form a pupil and the eye 115 acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the virtual image light after leaving the display system. The exit pupil defines the eyebox which comprises a spatial range of eye positions of the user in which the virtual images projected by the display system are visible.

The waveguide combiner includes a waveguide 205, as shown in FIG. 2, on which multiple optical couplers are disposed, as described below in the text accompanying FIG. 3. The waveguide facilitates virtual image light transmission between the display engine and the eye. One or more waveguides are usable in the display system because they are transparent and because they are generally small and lightweight (which is desirable in applications such as HMD devices where size and weight are generally sought to be minimized for reasons of performance and user comfort). For example, the waveguide can enable the display engine to be located out of the way, for example, on the side of the user's head or near the forehead, leaving only a relatively small, light, and transparent waveguide optical element in front of the eyes.

In an illustrative implementation, the waveguide 205 operates using a principle of total internal reflection (TIR), as shown in FIG. 2, so that light can be coupled among the various optical elements in the display system. TIR is a phenomenon which occurs when a propagating light wave strikes a medium boundary (e.g., as provided by the optical substrate of a waveguide) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta c$) is specified using the following equation:

$$\theta_c = \sin^{-1}(n2/n1)$$

where $\theta_c$ is the critical angle for two optical mediums (e.g., the waveguide substrate and air or some other medium that is adjacent to the substrate) that meet at a medium boundary, n1 is the index of refraction of the optical medium in which light is traveling towards the medium boundary (e.g., the waveguide substrate, once the light is coupled therein), and n2 is the index of refraction of the optical medium beyond the medium boundary (e.g., air or some other medium adjacent to the waveguide substrate).

Figure 3:
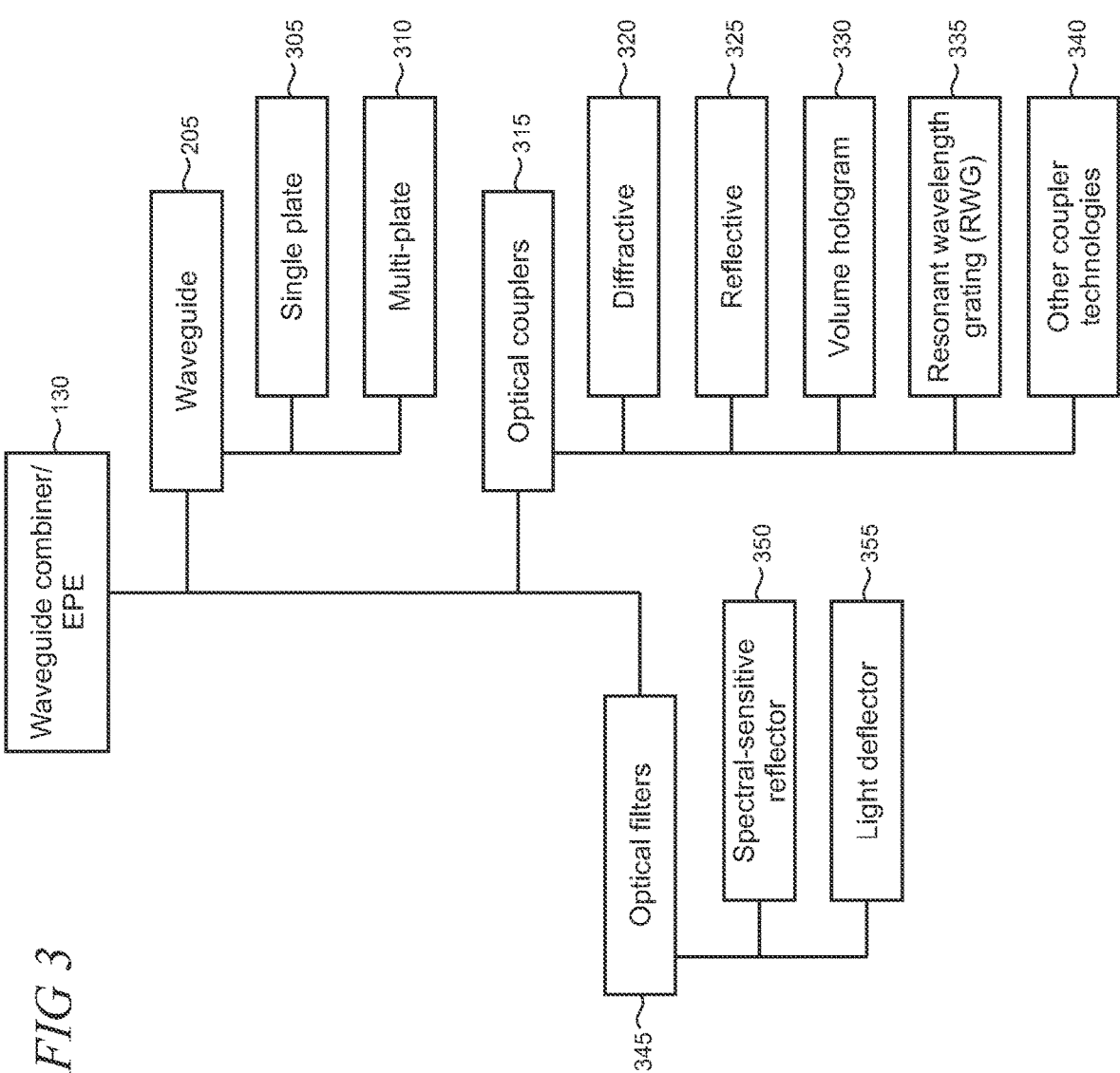
FIG. 3 is a block diagram of an illustrative waveguide combiner having exit pupil expansion (EPE) functionality.

FIG. 3 is a block diagram of an illustrative waveguide combiner 130 having EPE functionality. As noted above, the waveguide combiner includes a waveguide 205. A single waveguide plate 305 is used in some waveguide combiner applications while multiple stacked waveguide plates 310 are used in other applications. For example, a reflective waveguide combiner using optical couplers operating in reflection alternatively utilizes a single plate waveguide for both polychromatic and monochromatic applications. A waveguide combiner using diffractive optical elements (DOEs), such as surface relief gratings (SRGs), typically utilizes a separate waveguide plate to handle each color in a polychromatic color model such as RGB.

The waveguide combiner 130 further includes optical couplers 315, which in typical applications include an input and output coupler. In EPE applications, the waveguide combiner is configurable with an input coupler for in-coupling virtual images into the waveguide, an output cou-pler for out-coupling virtual images with expanded exit pupil in a first direction, and an intermediate coupler that operates to couple light between the input coupler and output coupler while expanding the exit pupil from the waveguide combiner in a second direction that is orthogonal to the first. The couplers 315 are implementable using a variety of optical technologies. These include diffractive 320, reflective 325, volume hologram 330, resonant wave-length grating (RWG) 335, and other suitable coupler tech-nologies 340, for example, optical metasurfaces.

Various combinations of optical technologies are usable and optical couplers of different types can be mixed in a given waveguide combiner architecture. For example, an input coupler is implemented using a prism, while the output coupler and/or intermediate coupler are implemented using SRGs.

The waveguide combiner 130 further includes optical filters 345 comprising a spectral-sensitive reflector 350 and light deflector 355. As shown in the block diagram in FIG.

4, the spectral-sensitive reflector 350 alternatively comprises a multi-notch reflector 405, such as a double-notch or triple-notch reflector, or a single-notch reflector 410. The multi-notch reflector is implementable in both a wideband configuration 415 and a narrowband 420 configuration. The single-notch reflector is implementable in a wideband configuration 425 and a narrowband 430 configuration. Further discussion about the spectral-sensitive reflector is provided below in the text accompanying FIGS. 18-26.

Figure 5:
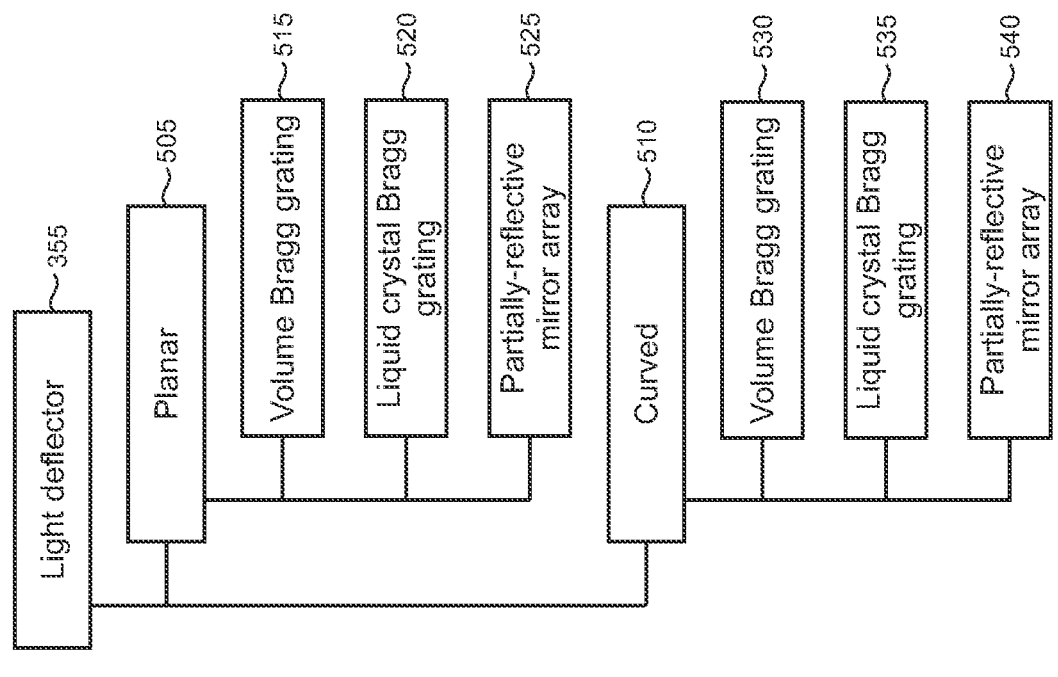
FIG. 5 is a block diagram of an illustrative light deflector.

As shown in the block diagram in FIG. 5, the light deflector 355 includes a planar configuration 505 or curved configuration 510. In some cases, a given light deflector design can include combinations of planar and curved sections as required to meet the requirements of a particular implementation. A planar configuration for the light deflector can include various optical technologies or combinations of technologies including, for example, volume Bragg gratings (VBGs) 515, liquid-crystal (LC) Bragg gratings 520, or an array 525 of partially-reflective mirrors that are disposed in a suitable substrate such as glass. Similarly, a curved configuration for the light deflector can include various optical technologies or combinations of technologies including, for example, VBGs 530, LC Bragg gratings 535, or an array 540 of partially-reflective mirrors.

Figure 6:
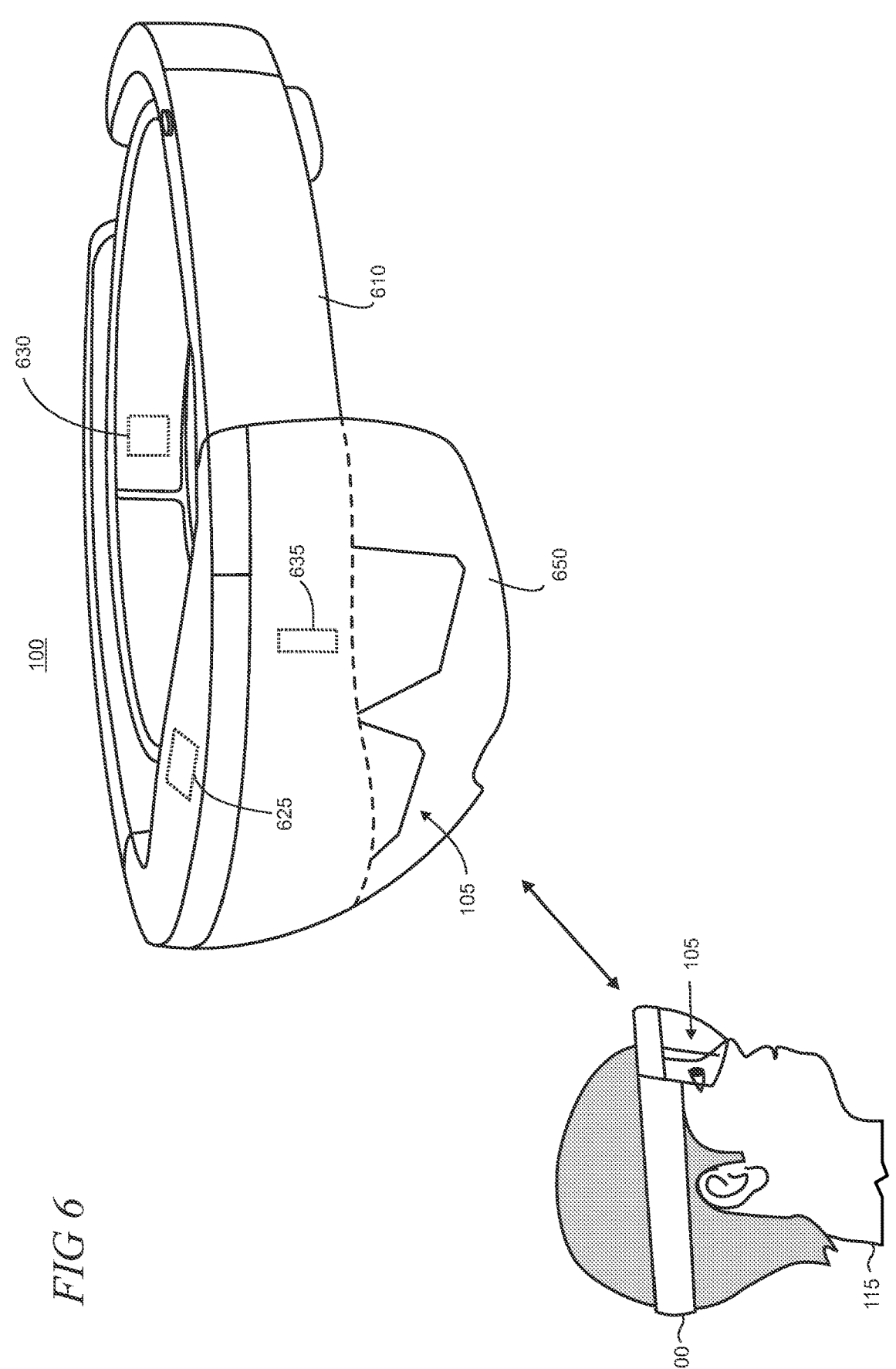
FIG. 6 shows a pictorial partially cutaway view of an illustrative HMD device that is configured with the present waveguide combiner with reduced light leakage.

FIG. 6 shows a pictorial partially cutaway view of an illustrative HMD device 100 that is configured with the present waveguide combiner with reduced light leakage. In this example, the HMD device includes a display system 105 and a frame 610 that wraps around the head of a user 115 to position the display system near the user's eyes to provide a virtual-reality or mixed-reality experience to the user. For a mixed-reality experience, the display system is see-through so that the user of the HMD device can view physical, real-world objects in the physical environment over which pixels for virtual objects are overlayed.

The frame 610 further supports additional components of the HMD device 100, including a processor 625, an inertial measurement unit (IMU) 630, and an eye tracker 635. The processor includes logic and associated computer memory configured to receive sensory signals from the IMU and other sensors, to provide display signals to the display system 105, to derive information from collected data, and to enact various control processes described herein. The HMD device includes a transparent eye shield 650 that protects the display system 105 from damage, for example, due to handling and environmental conditions.

Figure 7:
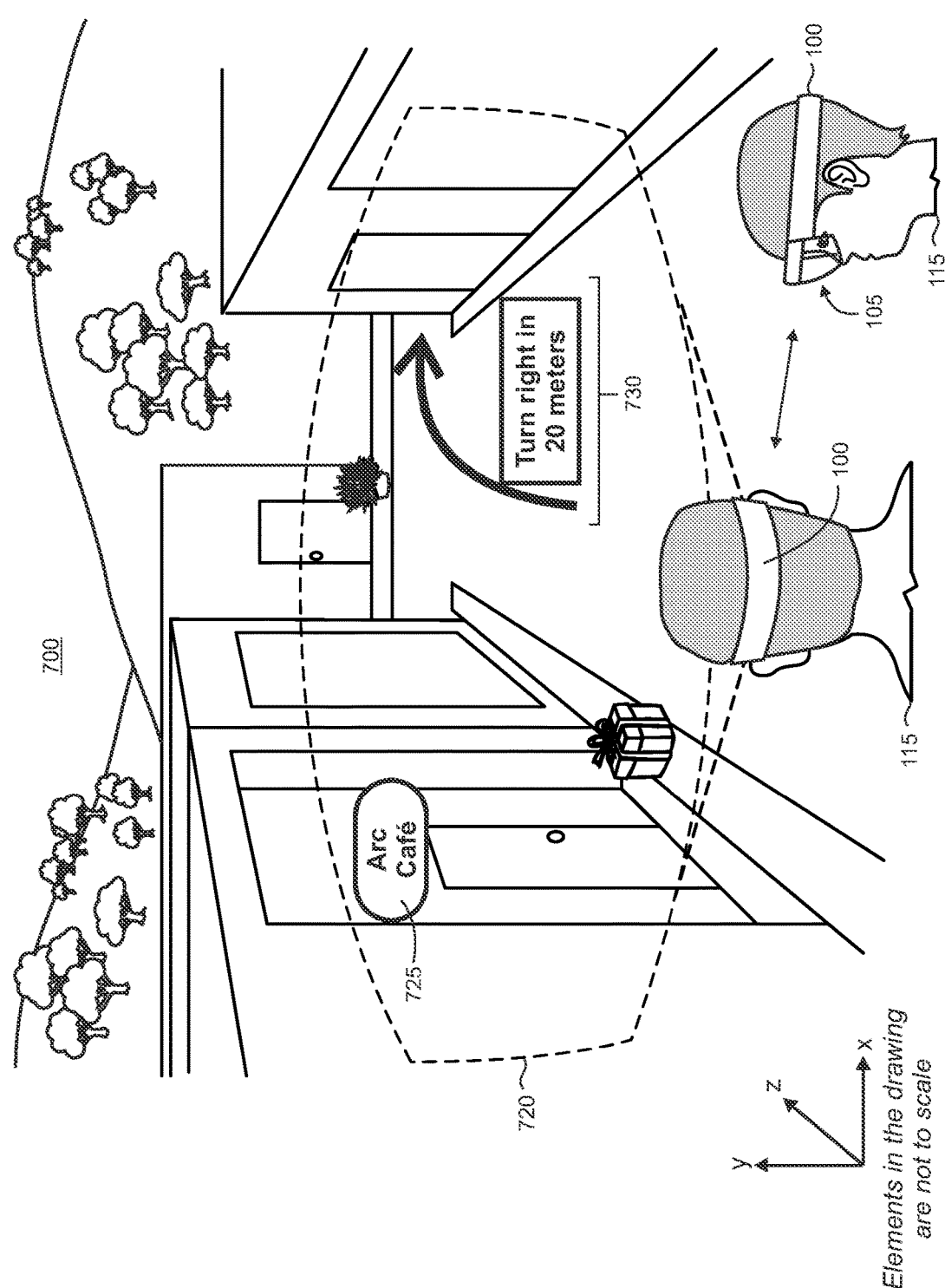
FIG. 7 illustratively shows virtual images that are over-layed onto real-world images within a field of view (FOV) of a mixed-reality head-mounted display (HMD) device.

FIG. 7 shows the HMD device 100 worn by a user 115 as configured for mixed-reality experiences in which the display system 105 is configured as a near-eye display system having at least a partially transparent, see-through waveguide, among various other components. As noted above, a suitable display engine (not shown) generates virtual images that are guided by the waveguide in the display system to the user. Being see-through, the waveguide in the display system enables the user to perceive light from the real world.

The display system 105 renders images of various virtual objects that are superimposed over the real-world images that are collectively viewed using the see-through waveguide display to thereby create a mixed-reality environment 700 within the HMD device's FOV (field of view) 720. It is noted that the FOV of the real world and the FOV of the images in the virtual world are not necessarily identical, as the virtual FOV provided by the display system is typically a subset of the real FOV. FOV is typically described as an angular parameter in horizontal, vertical, or diagonal dimensions.

It is noted that FOV is just one of many parameters that are typically considered and balanced by HMD device designers to meet the requirements of a particular implementation. For example, such parameters include eyebox size, brightness, transparency and duty time, contrast, resolution, color fidelity, depth perception, size, weight, form-factor, and user comfort (i.e., wearable, visual, and social), among others.

In the illustrative example shown in FIG. 7, the user 115 is physically walking in a real-world urban area that includes city streets with various buildings, stores, etc., with a countryside in the distance. The FOV of the cityscape viewed on HMD device 100 changes as the user moves through the real-world environment and the device can render static and/or dynamic virtual images over the real-world view. In this illustrative example, the virtual images include a tag 725 that identifies a restaurant business and directions 730 to a place of interest in the city. The mixed-reality environment 700 seen visually on the waveguide-based display system is also supplemented by audio and/or tactile/haptic sensations produced by the HMD device in some implementations.

FIGS. 8 and 9 show respective front and rear views of an illustrative example of the eye shield 650 that incorporates the display system 105 (FIG. 1) that is used in the HMD device 100 as worn by a user 115. The eye shield, in some implementations, is sealed to protect the internal display system. The shield typically interfaces with other components of the HMD device such as head-mounting/retention systems and other systems including sensors, power management, controllers, etc., as illustratively described in conjunction with FIGS. 39 and 40. Suitable interface elements (not shown) including snaps, bosses, screws, and other fasteners, etc. are incorporated into the eye shield in some implementations.

The eye shield 650 includes see-through front and rear shields, 805 and 810 respectively, that are molded using transparent or partially transparent materials to facilitate unobstructed vision to the display system and the surrounding real-world environment. Treatments are optionally applied to the front and rear shields such as tinting, mirroring, anti-reflective, anti-fog, and other coatings, and various colors and finishes are also utilizable. The front and rear shields are affixed to a chassis 1005 shown in the disassembled view in FIG. 10. The chassis supports a visor 1010, as shown.

The sealed eye shield 650 physically protects sensitive internal components, including the display system 105, when the HMD device is operated and during normal handling for cleaning and the like. The display system in this illustrative example includes left and right waveguide combiners 130L and 130R that respectively provide virtual images to the user's left and right eyes for mixed- and/or virtual-reality applications. The eye shield also protects the display system from environmental elements and damage should the HMD device be dropped or bumped, impacted, etc.

Figure 16:
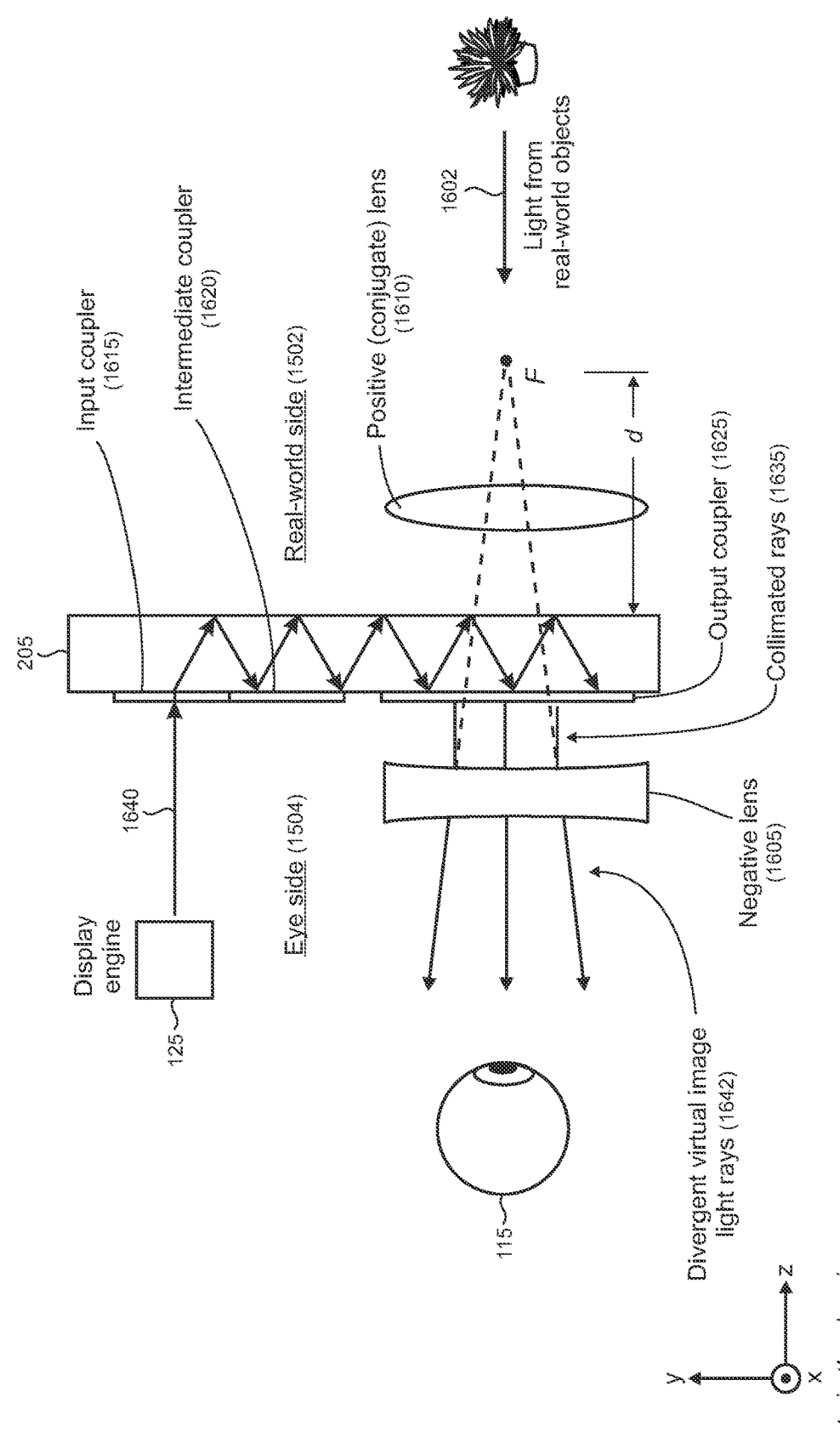
FIG. 16 is a side view of an illustrative waveguide combiner that employs a conjugate lens pair to provide for display of virtual images at a fixed focal distance.

As shown in FIG. 9, the rear shield 910 is configured in an ergonomically suitable form 915 to interface with the user's nose, and nose pads and/or other comfort features can be included (e.g., molded-in and/or added-on as discrete components). In some applications, the sealed eye shield can also incorporate some level of optical diopter curvature (i.e., eye prescription) within the molded shields in some cases. The sealed eye shield is also configurable to incorporate a conjugate lens pair as shown in FIG. 16 and described in the accompanying text.

Figure 11:
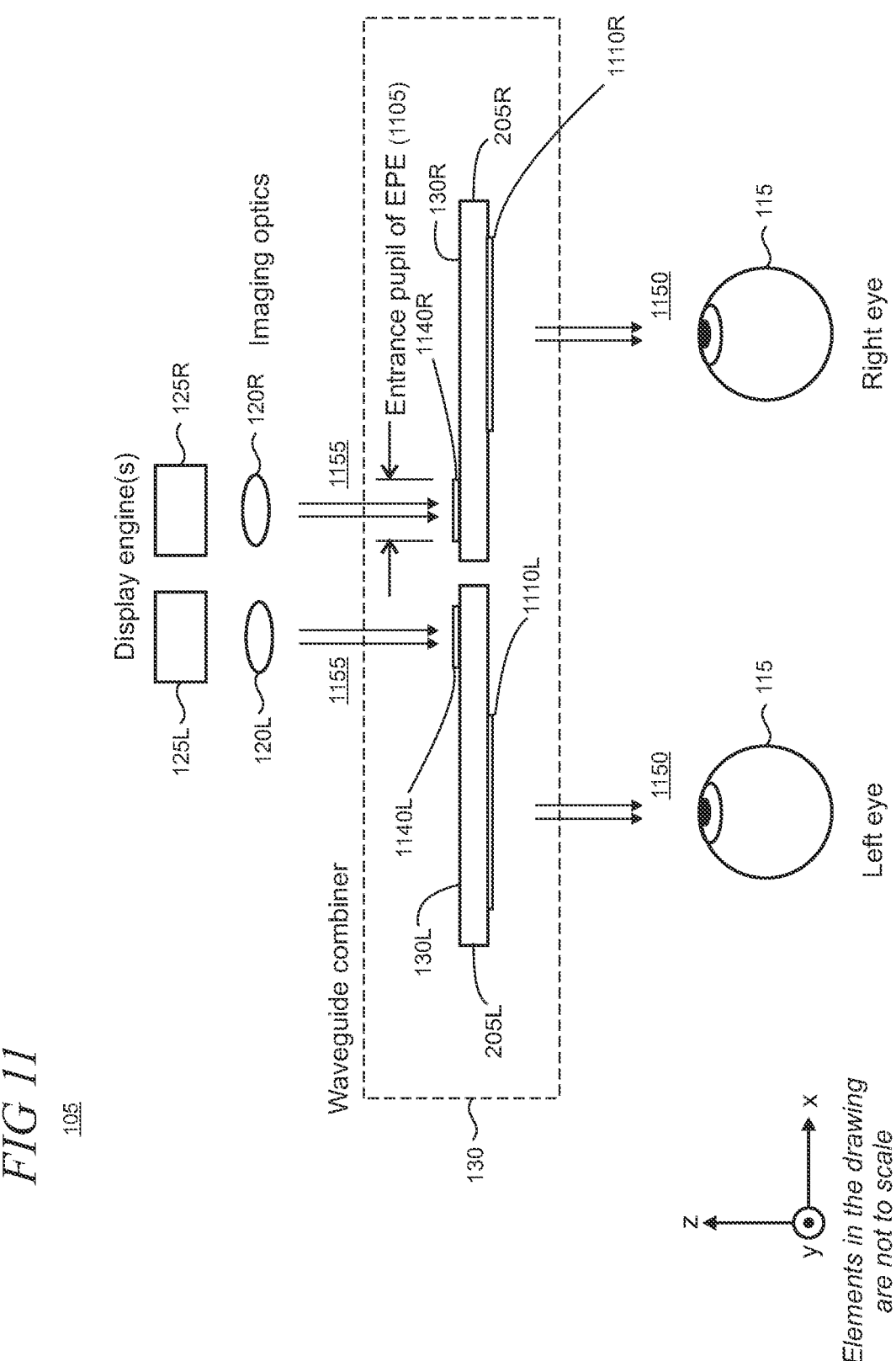
FIG. 11 shows a top view of an illustrative waveguide combiner that includes an EPE.

FIG. 11 shows a top view of an illustrative display system 105 that uses separate left and right combiners (130L and 130R), each associated with a respective display engine (125L and 125R) and imaging optics (120L and 120R) to generate, for example, stereo virtual images for the user 115. Each waveguide includes EPE functionality and receives one or more input optical beams from a respective display engine as an entrance pupil 1105 for virtual image light to produce one or more output optical beams with expanded exit pupil relative to the input. The expanded exit pupil typically facilitates a virtual display to be sufficiently sized to meet the various design requirements, such as eyebox size, image resolution, FOV, and the like, of a given optical system while enabling the imager and associated components to be relatively light and compact.

The waveguide combiner 130 utilizes two output couplers, 1110L and 1110R that are supported on the waveguides 205L and 205R and two input couplers 1140L and 1140R. The input and output couplers are configurable using various ones of the technologies shown in FIG. 3 and described in the accompanying text. Intermediate couplers (not shown in FIG. 11) are disposed on the left and right waveguides to provide exit pupil expansion in one direction. The couplers are generally arrangeable in various configurations on the waveguides, for example, on the same side or different sides of the waveguides and may further be single- or double-sided in some implementations. While the waveguide combiner is depicted as having a planar configuration, other shapes may also be utilized including, for example, curved or partially spherical shapes, in which case the optical couplers disposed thereon may be non-co-planar.

Exemplary output beams 1150 from the waveguide combiner 130 are parallel to the exemplary input beams 1155 that are output from the display engines 125 to the input couplers 1140. In some implementations, the input beams are collimated such that the output beams are also collimated, as indicated by the parallel lines in the drawing. Typically, in waveguide-based combiners, the input pupil needs to be formed over a collimated field, otherwise each waveguide exit pupil will produce an image at a slightly different distance. This results in a mixed visual experience in which images are overlapping with different focal depths in an optical phenomenon known as focus spread.

Figures 12, 13:
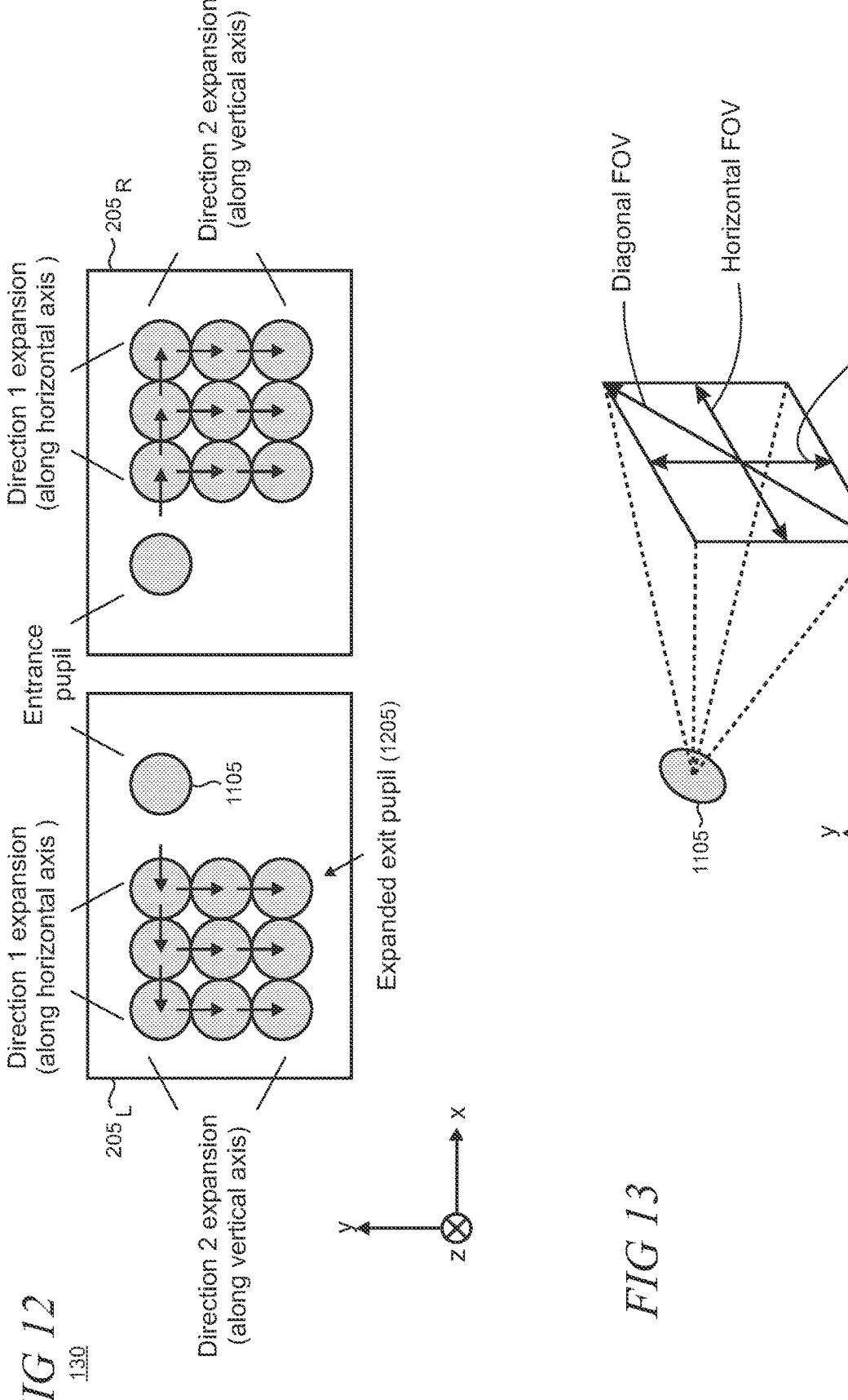
FIG. 12 shows a front view of an illustrative waveguide combiner with an exit pupil expander in which the exit pupil is expanded along two directions of the field of view (FOV) via pupil replication.
FIG. 13 shows an illustrative input to an exit pupil expander in which the FOV is described by angles in horizontal, vertical, or diagonal orientations.

As shown in FIG. 12, the waveguide combiner 130 is configured to provide an expanded exit pupil 1205 in two directions (i.e., along each of a first and second coordinate axis) compared with the entrance pupil 1105 at the input couplers of the waveguide combiner 130. As shown, the exit pupil is expanded in both the vertical and horizontal directions. It may be understood that the terms "left," "right," "up," "down," "direction," "horizontal," and "vertical" are used primarily to establish relative orientations in the illustrative examples shown and described herein for ease of description. These terms may be intuitive for a usage scenario in which the user of the near-eye display system is upright and forward facing, but less intuitive for other usage scenarios. The listed terms are not to be construed to limit the scope of the configurations (and usage scenarios therein) of near-eye display features utilized in the present arrangement.

The entrance pupil 1105 to the waveguide combiner at the input couplers is generally described in terms of FOV, for example, using horizontal FOV, vertical FOV, or diagonal FOV as shown in FIG. 13.

Figure 14:
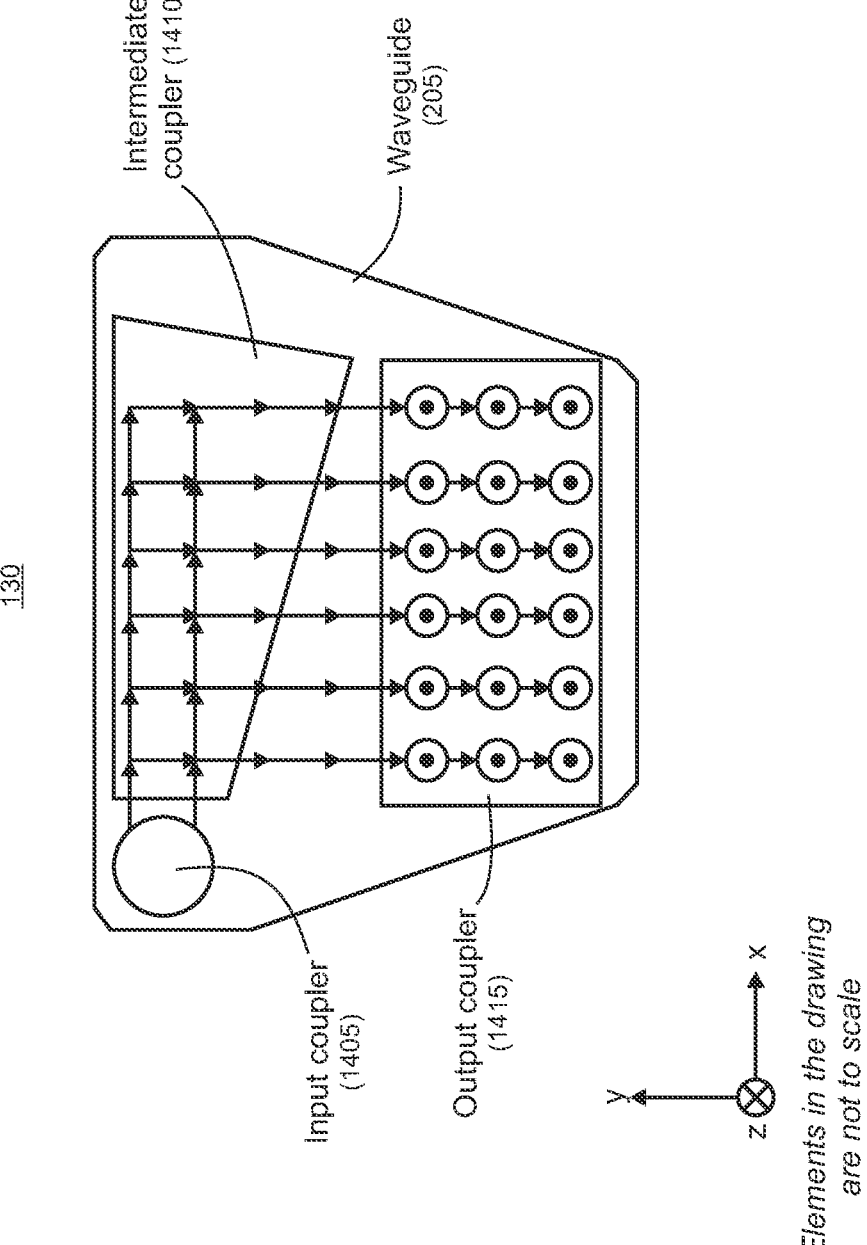
FIG. 14 shows illustrative propagation paths of virtual image light in an arrangement of optical coupling elements in a waveguide combiner.

FIG. 14 shows illustrative propagation paths of virtual image light in an arrangement of optical coupling elements in a waveguide combiner 130. The drawing provides a front view of the waveguide combiner 130 that includes an input coupler 1405, intermediate coupler 1410, and output coupler 1415 disposed on a see-through waveguide 205 that provide in-coupling, exit pupil expansion in two directions, and out-coupling in a mixed-reality environment. The illustrative waveguide combiner is shown, for example, for a single eye in a stereo display or is usable in a monoscopic application. The input coupler receives virtual images from a display engine (not shown) and couples them to the intermediate coupler which horizontally expands the exit pupil and couples the virtual image light downwards (i.e., in the negative y direction) to the output coupler. The output coupler vertically expands the exit pupil and out-couples the virtual image light to a user's eye (not shown) with expanded pupil in two directions.

Figure 15:
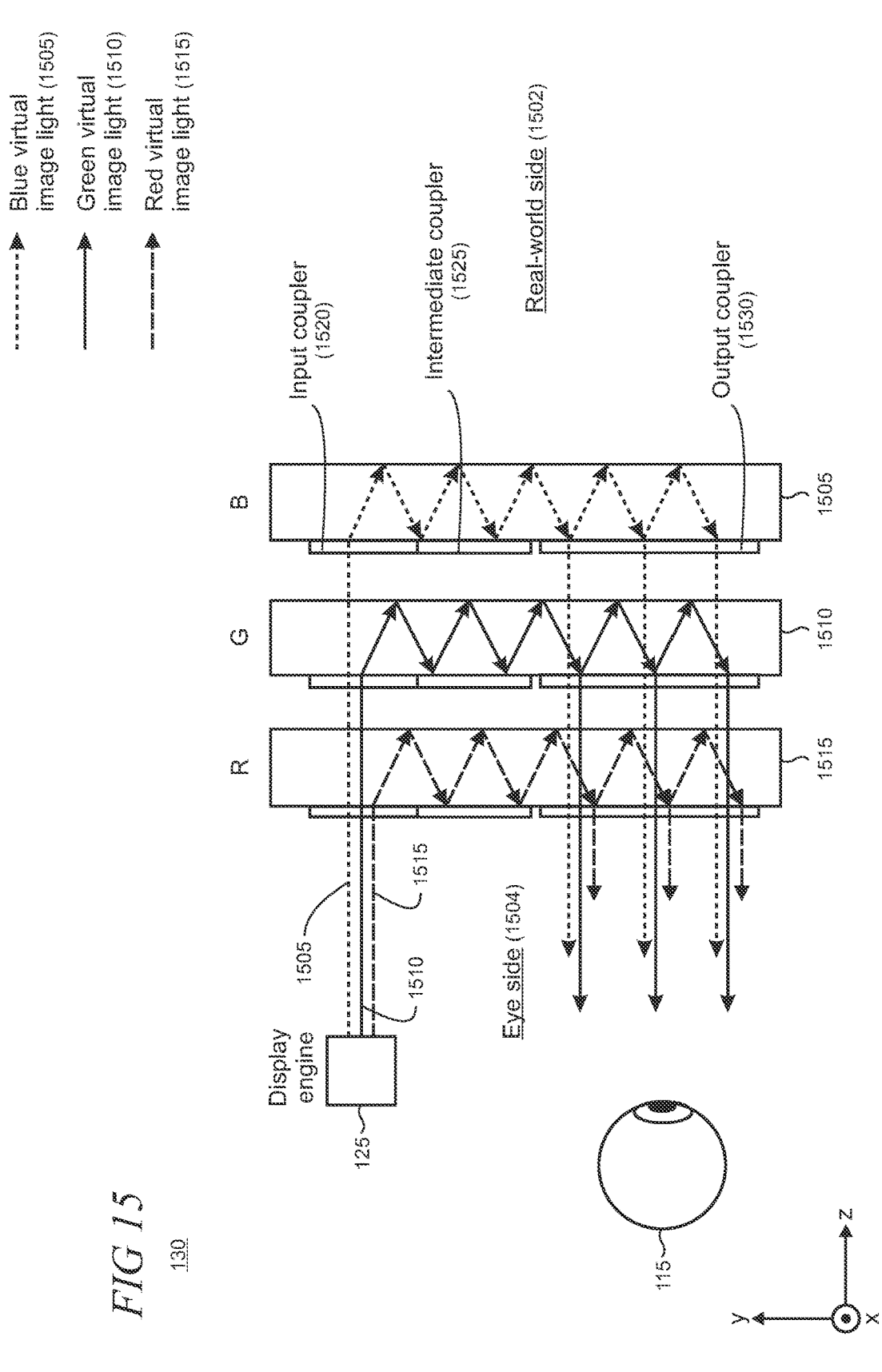
FIG. 15 is a side view of an illustrative waveguide combiner showing propagation of virtual image light through separate waveguide plates for each color of an RGB (red, green, blue) color model.

FIG. 15 is a side view of the waveguide combiner 130 showing propagation of virtual image light through separate waveguide plates for each color of an RGB color model. As shown, the real-world side of the waveguide combiner is indicated by reference numeral 1502 and the eye side by reference numeral 1504. For a given angular range within the FOV, light for each color component 1505, 1510, and 1515 provided by the display engine 125 is in-coupled into respective waveguides 1505, 1510, and 1515 using respective individual input couplers (representatively indicated by element 1520). The virtual image light for each color propagates through the respective intermediate couplers (representatively indicated by element 1525) and the waveguides in TIR and is out-coupled by respective output couplers (representatively indicated by element 1530) to the user's eye 115 with an expanded pupil in the horizontal and vertical directions.

FIG. 16 is a side view of the waveguide combiner 130 showing propagation of virtual image light through a lens pair including a negative lens 1605 and a positive (conjugate) lens 1610 to provide for display of virtual images at a fixed focal distance. In this illustrative example, a single waveguide 205 is utilized in the waveguide combiner. For example, the waveguide is configurable using reflective optical couplers, including an input coupler 1615, intermediate coupler 1620, and output coupler 1625, that operate with polychromatic virtual image light. Alternatively, the single waveguide is used in monochromatic virtual image display use cases. The waveguide combiner operates to superimpose rendered virtual images over the user's view of light from real-world objects 1602 to thus form a mixed-reality display.

The negative lens is located on the eye side 1504 of the waveguide 205. The negative lens acts over the entire extent of the eyebox associated with the user's eye to thereby create the diverging rays 1630 from the collimated rays 1635 that exit the output coupler 1625. When the display engine 125 is operated to project virtual images 1640 that are in-coupled into the waveguide 205, the output diverging rays 1642 present the virtual images at a predetermined focal depth, d, from the display system at an apparent or virtual point of focus, F. For example, if the negative lens is configured with −0.5 diopters of optical power, then d is equal to 2 m.

Figure 17:
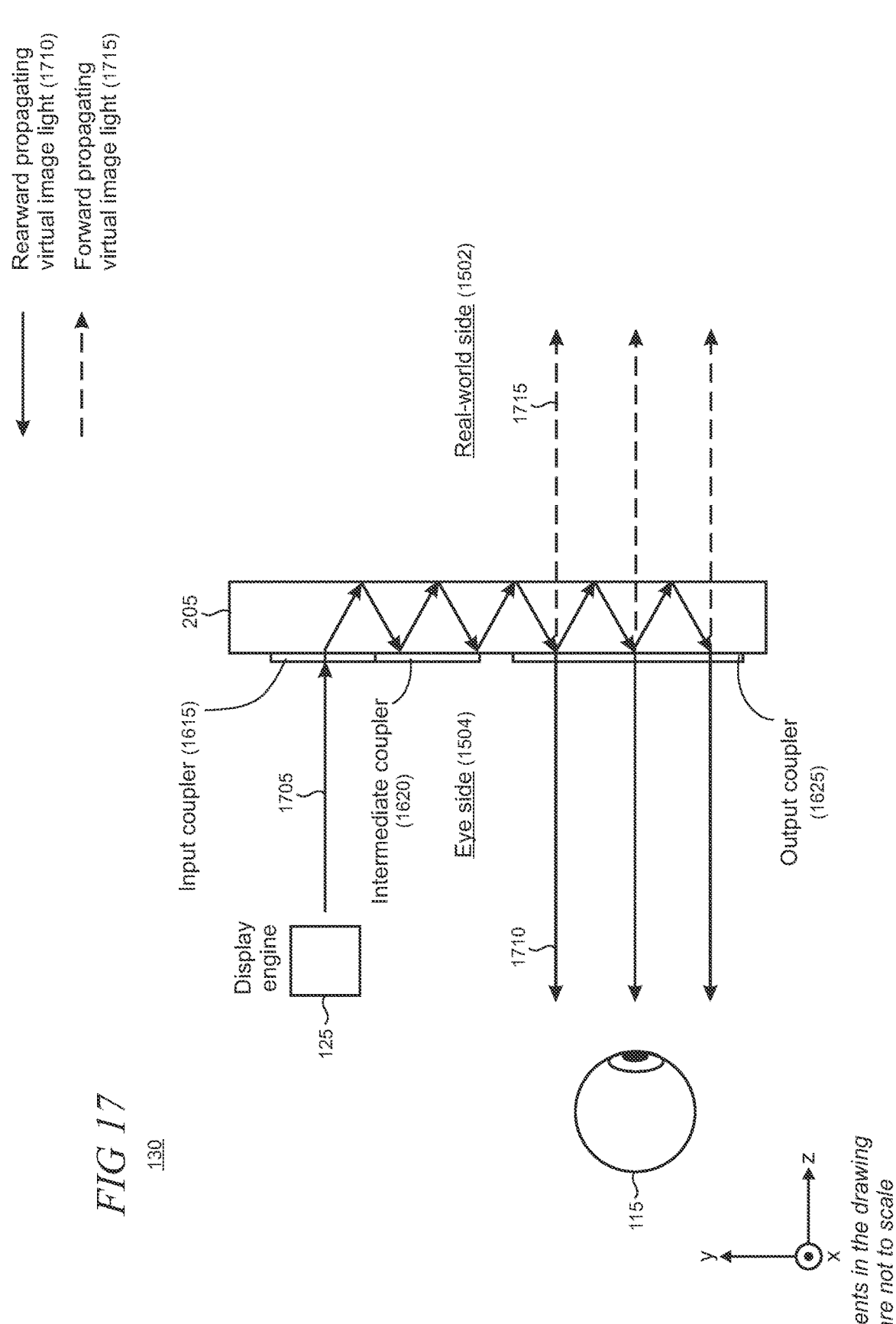
FIG. 17 is a side view of an illustrative waveguide combiner showing virtual image light propagating in for-ward and backward directions from an output coupler.

FIG. 17 illustratively shows how virtual image light propagates in forward and backward directions from the output coupler 1625 (the conjugate lens pair is omitted from the drawing to aid clarity in presentation). As noted above, only a single waveguide 205 of a waveguide combiner 130 is utilized in this illustrative embodiment. However, it may be appreciated that the principles of operation illustrated in the drawing are applicable to a waveguide combiner that uses multiple waveguide plates. Virtual image light 1705 from the display engine 125 within a particular FOV angle and wavelength is in-coupled by the input coupler 1615. When the virtual image light propagates to the output coupler 1625, it is diffracted forward (i.e., towards the real-world side 1502 of the waveguide) and rearward (i.e., towards the eye side 1504 of the waveguide and the eye 115 of the user). The distribution between forward and rearward propagation is typically dependent on FOV angle, but on average is equally split between the two directions.

Unlike the rearward-propagating light 1710, the forward propagating virtual image light 1715 is typically unusable and thus is considered wasted light in some cases. In addition, the forward propagating virtual image light may be visible by others which can be a nuisance in some applications or represent a security risk in other applications where it is desired that an HMD user's location is not revealed, particularly, for example, at nighttime or in dark environments.

Figure 18:
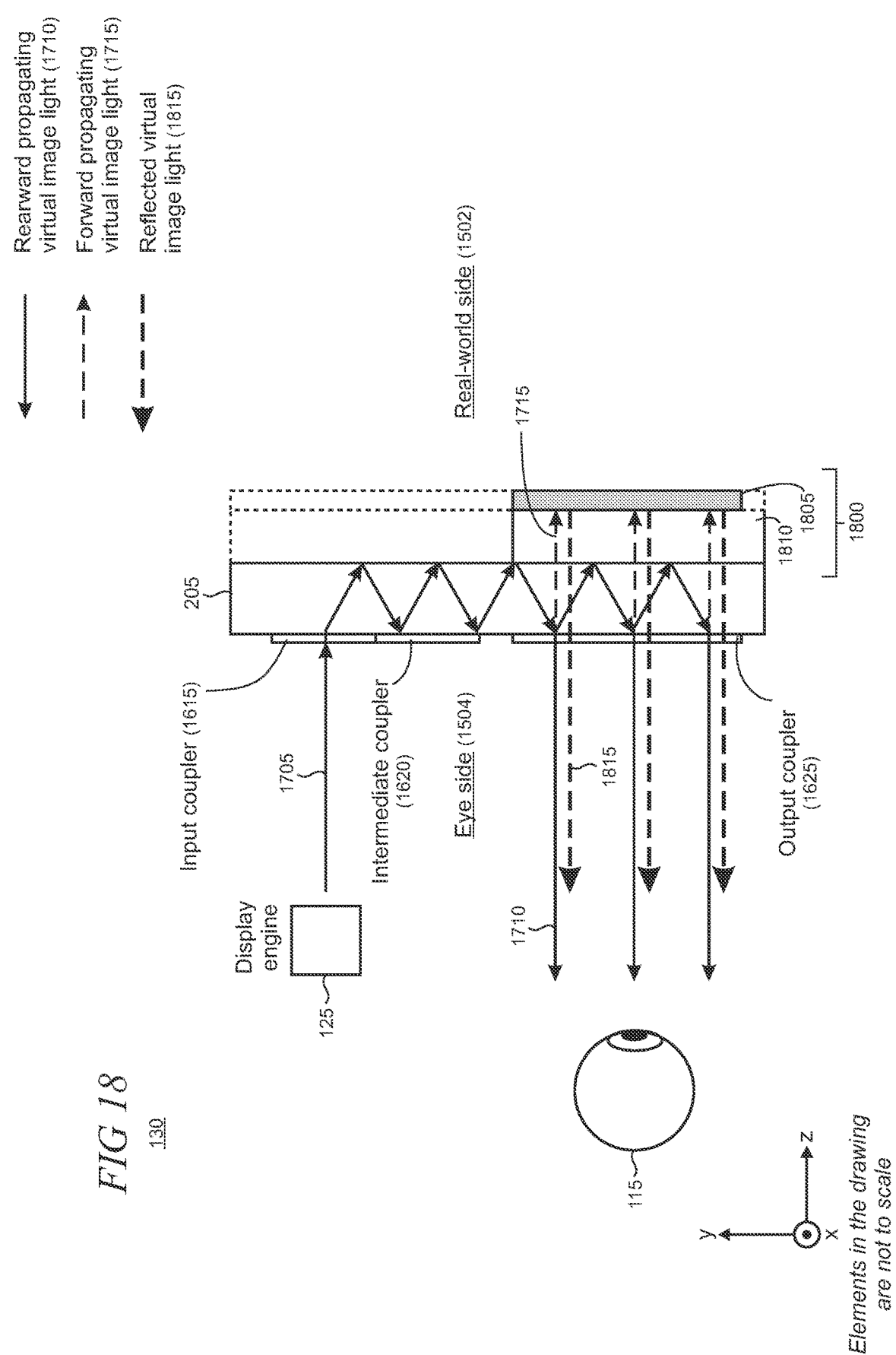
FIG. 18 is a side view of an illustrative waveguide combiner as configured with a spectral-sensitive reflector to reflect forward-propagating virtual image light back towards an eye of a user.

FIG. 18 is a side view of the waveguide combiner 130 as configured with a spectral-sensitive reflector 1800 to reflect forward-propagating virtual image light back towards an eye of a user 115 (the conjugate lens pair is omitted from the drawing to aid clarity in presentation). The spectral-sensitive reflector comprises a thin film coating 1805 that is disposed on an optical substrate 1810. The thin film comprises a spectral-sensitive reflective coating that is configured to reflect virtual image light within wavelength ranges output by the display engine 125. The reflectance characteristics of the spectral-sensitive reflector can be tailored to be fairly consistent over a range of angles associated with the FOV of the display to ensure that the luminance associated with the reflected virtual light is acceptably uniform over the entire display.

As shown, the spectral-sensitive reflector 1800 is located on the real-world side 1502 of the waveguide 205. In some implementations, the spectral-sensitive reflector is sized and shaped to match the footprint of the output coupler 1625 and associated eyebox. In other implementations, the spectral-sensitive reflector is sized and shaped to match the footprint of the waveguide 205, as indicated by the dashed lines in the drawing. Utilization of the spectral-sensitive reflector enables a portion of forward propagating virtual image light 1715 to be reflected back to the eye of the user 115 over the entirety of the eyebox to increase the luminance of the displayed virtual images. The reflected virtual image light is indicated by reference numeral 1815 in the drawing.

The amount of forward-propagating virtual image light that is recovered is dependent on the degree of reflectance that is specified for the spectral-sensitive reflector. Increased reflectance will increase luminance of the virtual images and improve light security of the HMD device with the tradeoff that see-through transmission is reduced, as discussed above in the text accompanying FIG. 17. It will be appreciated that the specific balance between virtual image luminance and see-through transmission can be implemented as needed to meet particular application requirements.

Figure 4:
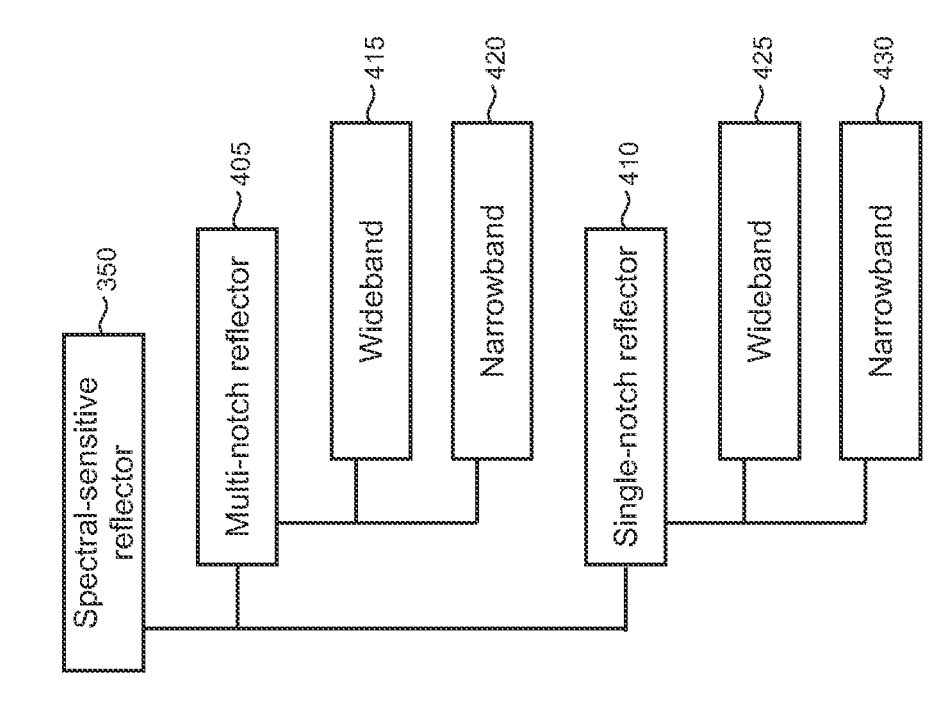
FIG. 4 is a block diagram of an illustrative spectral-sensitive reflector.
Figure 19:
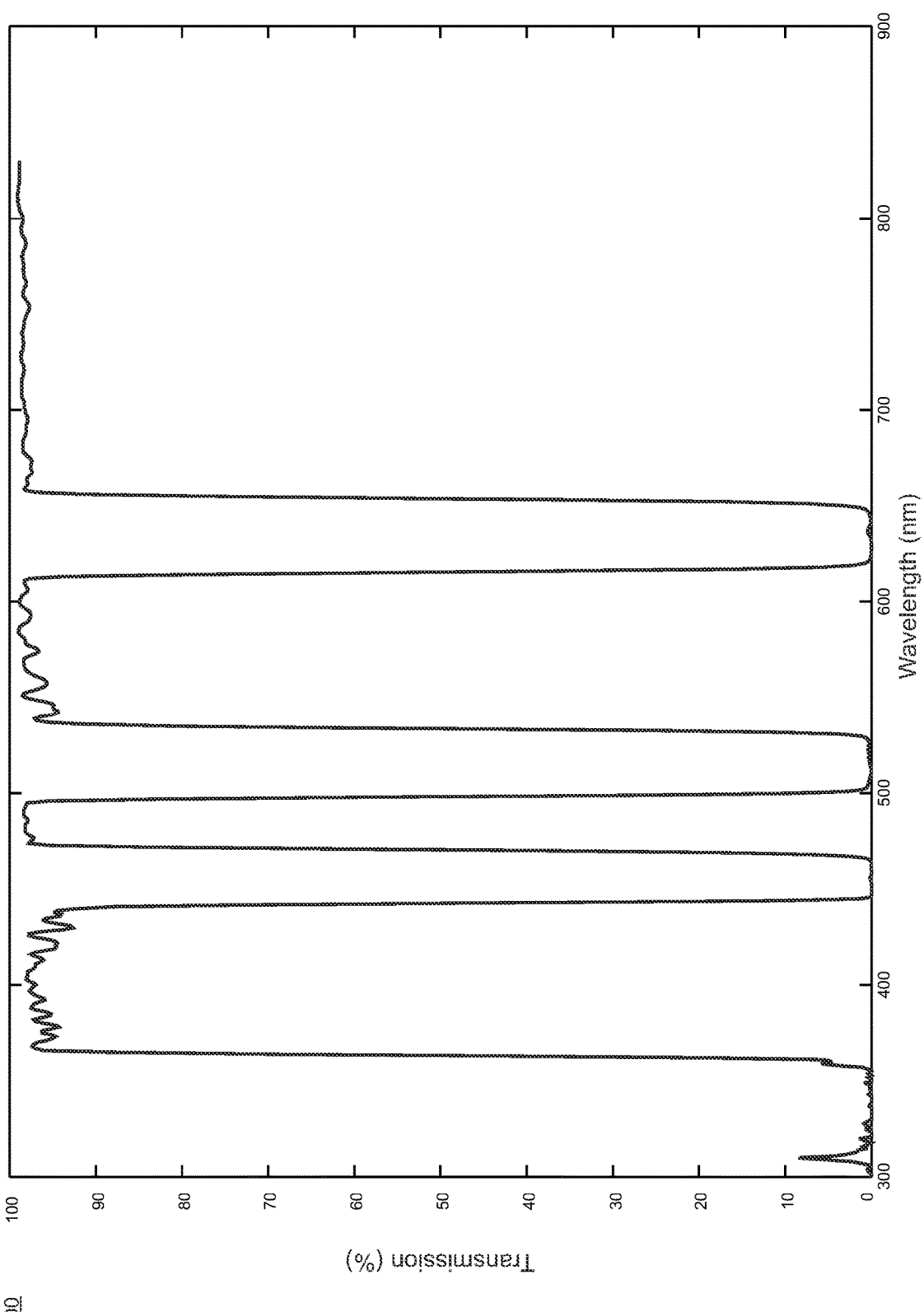
FIG. 19 is a graph of transmission vs. wavelength for an illustrative wideband triple-notch spectral-sensitive reflec-tor.
Figure 20:
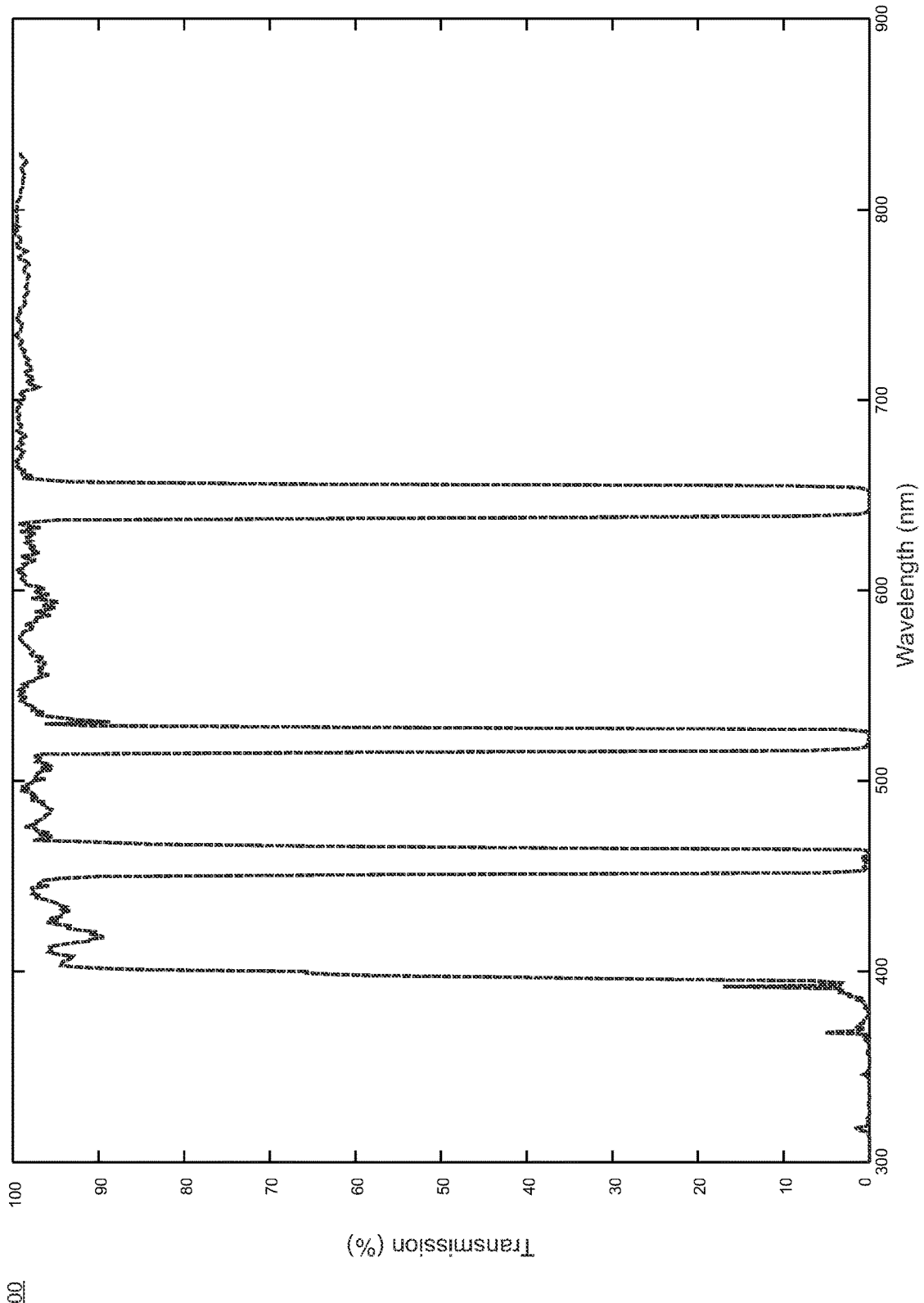
FIG. 20 is a graph of transmission vs. wavelength for an illustrative narrowband triple-notch spectral-sensitive reflector.
Figure 21:
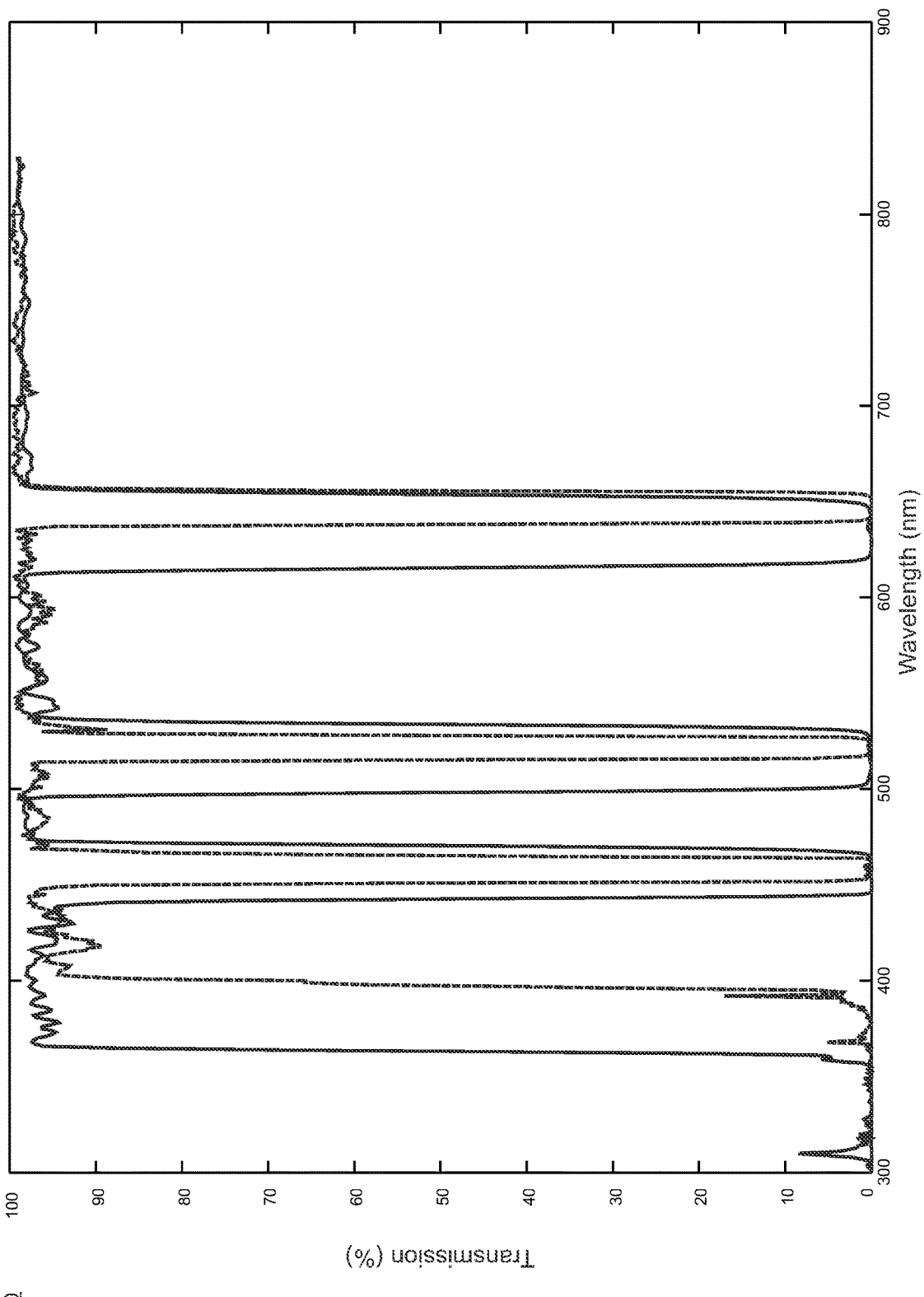
FIG. 21 is a graph of transmission vs. wavelength for both an illustrative wideband triple-notch spectral-sensitive reflector and an illustrative narrowband triple-notch spec-tral-sensitive reflector.
Figure 22:
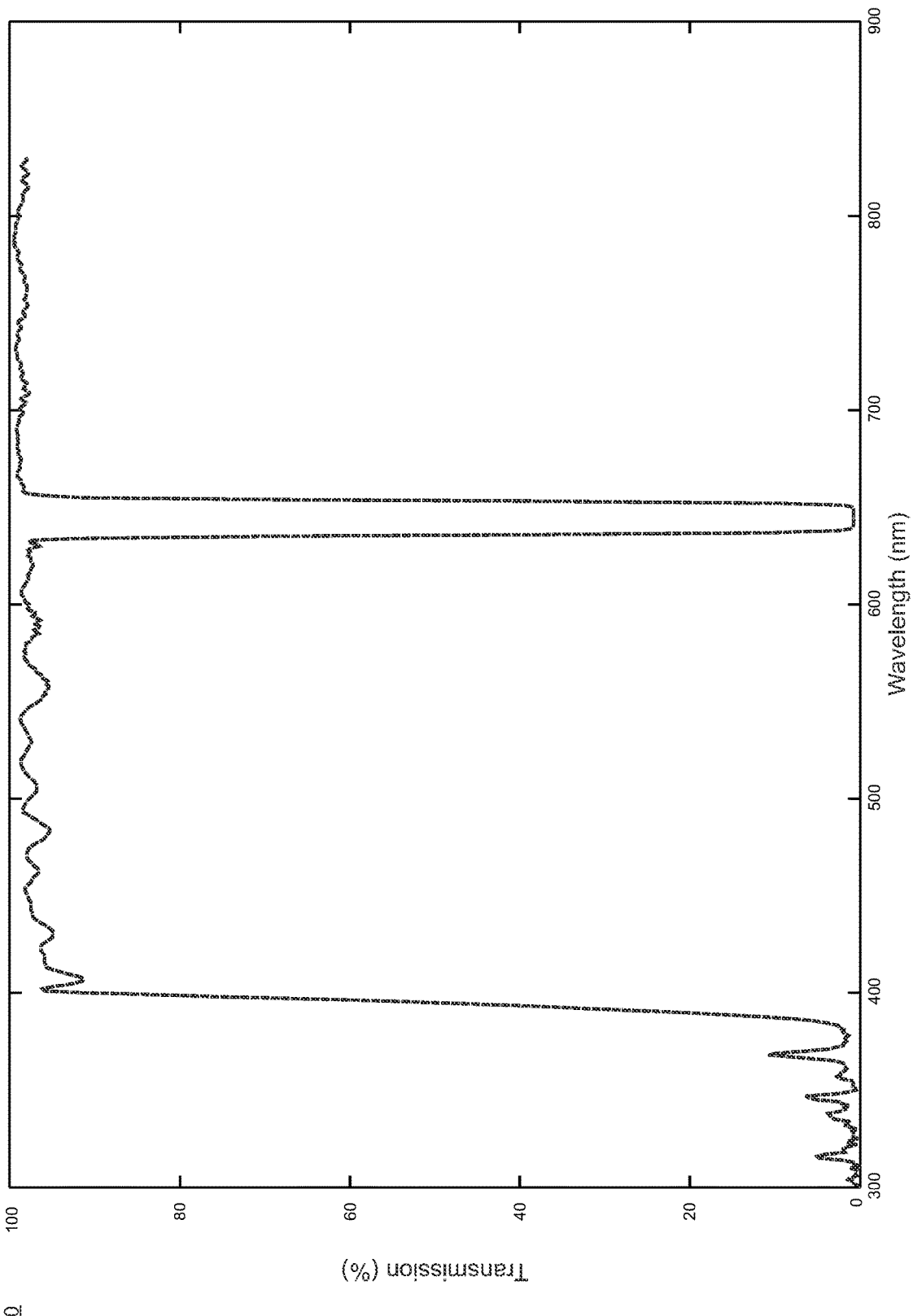
FIG. 22 is a graph of transmission vs. wavelength for an illustrative narrowband single-notch spectral-sensitive reflector.
Figure 23:
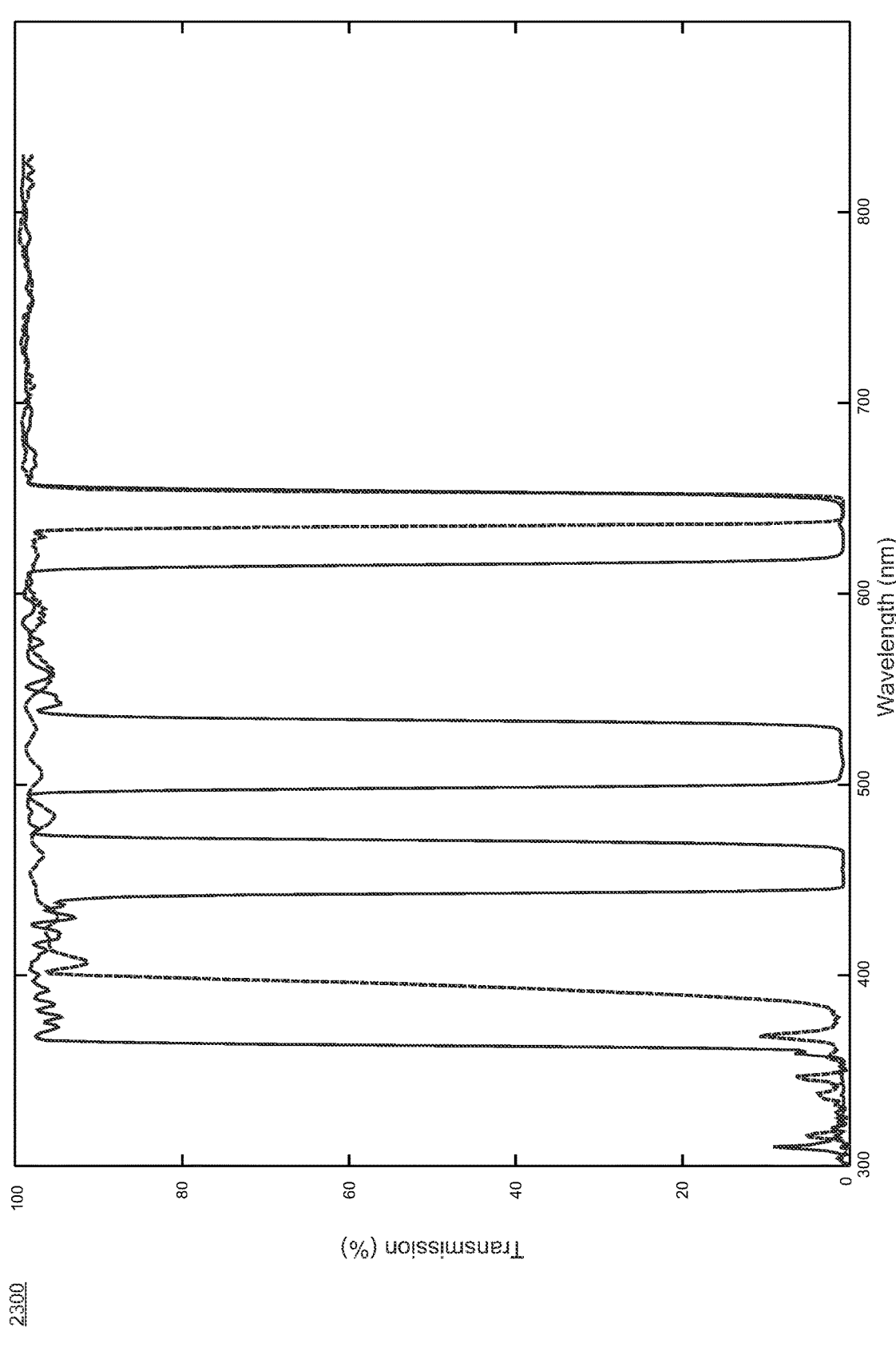
FIG. 23 is a graph of transmission vs. wavelength for both an illustrative wideband triple-notch spectral-sensitive reflector and an illustrative single-notch spectral-sensitive reflector.

As noted above in the text accompanying FIG. 4, the design of the spectral-sensitive reflector can vary by application and includes wideband and narrowband multi-notch reflectors and wideband and narrowband single-notch reflectors. FIGS. 19-23 show illustrative spectral-sensitive reflector designs. It is emphasized that the designs shown are intended to be illustrative and not limiting. It may be appreciated that the reflectance profile selected for a given spectral-sensitive reflector design can be matched to the characteristics of a given display engine while striking an appropriate balance between virtual image light leakage reduction and see-through transmission quality. FIG. 19 is a graph 1900 of transmission vs. wavelength for an illustrative wideband triple-notch spectral-sensitive reflector. FIG. 20 is a graph 2000 of transmission vs. wavelength for an illustrative narrowband triple-notch spectral-sensitive reflector. FIG. 21 is a graph 2100 of transmission vs. wavelength for both an illustrative wideband triple-notch spectral-sensitive reflector and an illustrative narrowband triple-notch spectral-sensitive reflector. FIG. 22 is a graph 2200 of transmission vs. wavelength for an illustrative narrowband single-notch spectral-sensitive reflector. FIG. 23 is a graph 2300 of transmission vs. wavelength for both an illustrative wideband triple-notch spectral-sensitive reflector and an illustrative single-notch spectral-sensitive reflector;

The thin film coating 1805 (FIG. 18) comprises single or multiple layers of dielectric materials in which the coating composition and thickness is selected to provide the desired reflectance characteristics over the FOV and bandpass of interest. The thin film coating is generally disposed uniformly across the substrate 1810 so that the real world appears consistently across the entire see-through display for all angles associated with a given FOV that is selected for the waveguide combiner. As reflectance of the thin film coating can be expected to vary as a function of angle, some threshold reflectance can typically be specified that provides a satisfactory function across the FOV range.

Figure 24:
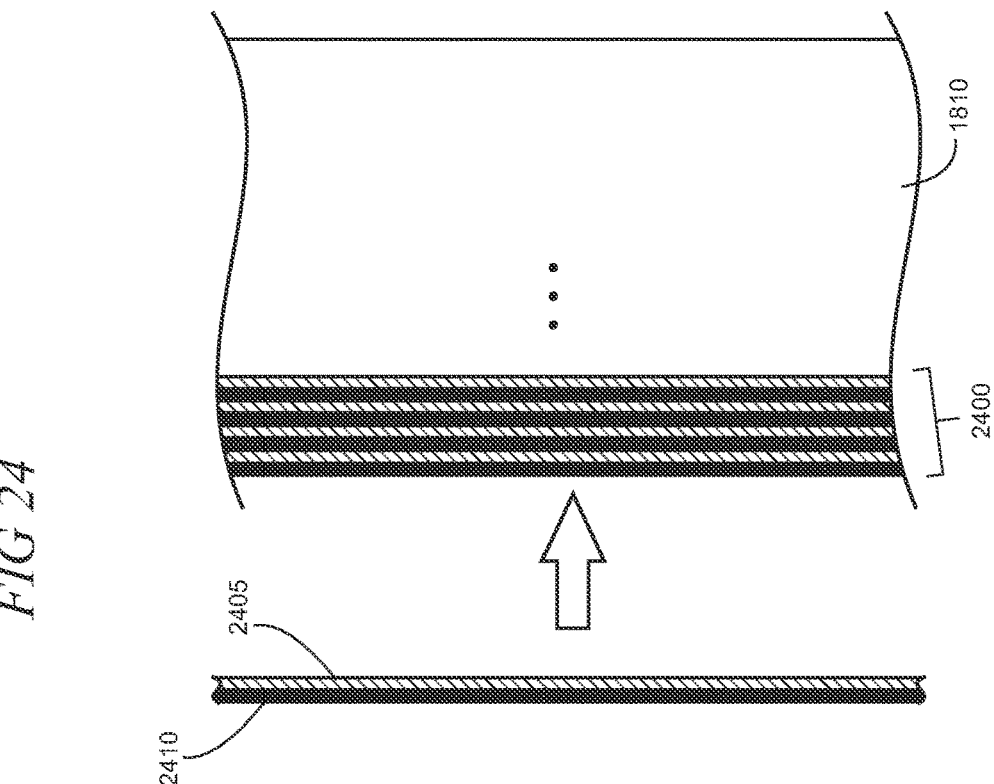
FIG. 24 shows an illustrative thin film reflective coating that includes alternating layers of two different materials on a surface of an optical substrate.

FIG. 24 shows an illustrative thin film spectral-sensitive reflective coating 2400 that includes alternating layers of two different materials 2405 and 2410 that are disposed on a surface of a substrate 1810. The materials each have a different refractive index and may include, for example, silicon dioxide ($SiO_2$), titanium dioxide ($TiO_2$), and aluminum oxide ($Al_2O_3$). In an illustrative embodiment, the layers of different materials are alternately arranged using, for example, silicon dioxide and titanium dioxide. It is noted that the number of layers shown in the drawings is intended to be illustrative and that variations from the configuration shown can be expected as necessary to meet the requirements of a particular implementation.

Other exemplary dielectric materials utilizable in the thin film spectral-sensitive reflective coating 2400 include, but are not limited to, silicon hydride (SixHy), silicon nitride (SixNy), silicon oxynitride (SixOzNy), tantalum oxide (TaxOy), gallium arsenide (GaAs), and gallium nitride (GaN). It is also possible that one or more layers of the coating may comprise metallic layers that are non-dielectric.

Chemical and/or physical deposition techniques can be used to deposit the materials on a surface of the substrate 1810 to form the thin film coating 2400. Exemplary chemical deposition techniques that can be used include, but are not limited to, chemical solution deposition (CSD), spin coating, chemical vapor deposition (CVD), plasma-enhanced chemical film conversion (PECFC), and atomic layer deposition (ALD). Exemplary physical deposition techniques that can be used include, but are not limited to, physical vapor deposition (PVD), molecular beam epitaxy (MBE), sputtering, pulsed laser deposition (PLD), cathodic arc deposition (arc-PVD), and electrohydrodynamic deposition.

Figure 25:
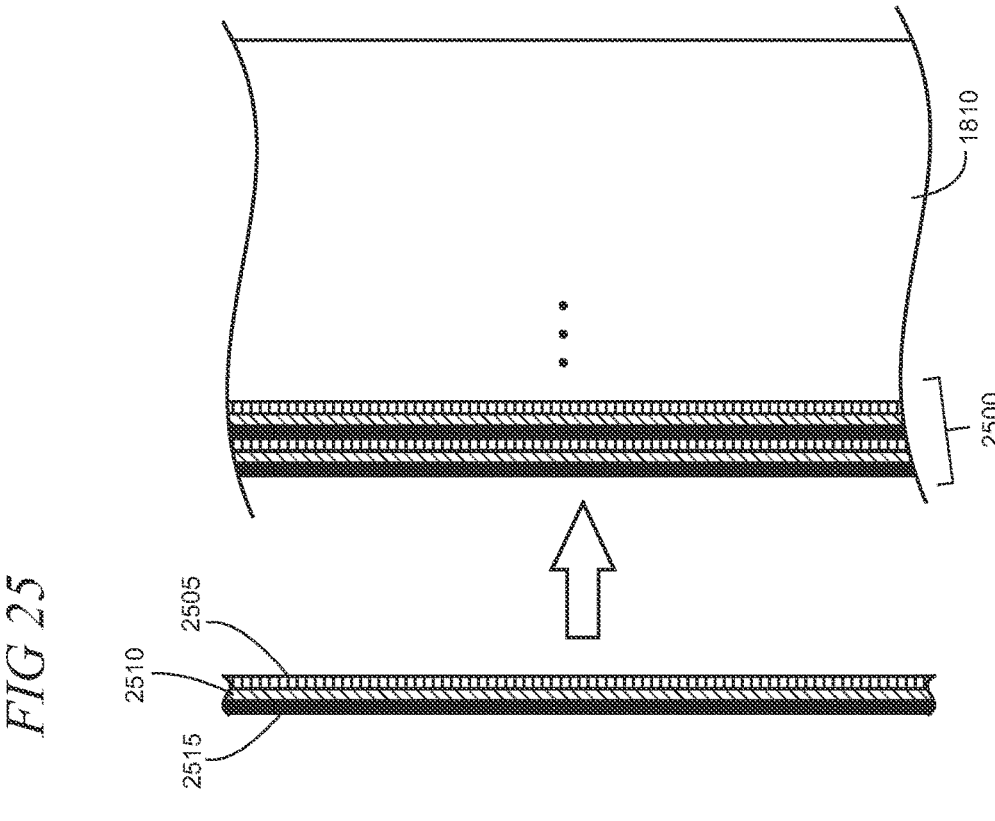
FIG. 25 shows an illustrative thin film reflective coating that includes alternating layers of three different materials on a surface of an optical substrate.

FIG. 25 shows an illustrative thin film spectral-sensitive reflective coating 2500 that includes alternating layers of three different materials 2505, 2510, and 2515 that are disposed on a surface of an optical substrate 1810. In an illustrative embodiment, the layers of different materials are alternately arranged, for example, using silicon dioxide, titanium dioxide, and aluminum oxide.

The number of layers that are utilized for a thin film spectral-sensitive reflective coating can vary to meet the needs of a particular application. In general, it is desirable to minimize the number of layers to simplify fabrication and reduce costs. Thicker coatings typically give rise to stresses in the spectral-sensitive reflective reflector that can cause strain in the substrate 1810 that negatively impacts alignment and flatness (with concomitant negative impact on MTF (modulation transfer function—a parameter that describes resolution and contrast)) and reduce reliability. While thicker substrates may be used to reduce the strain and help to maintain alignment and flatness, such configuration typically results in more weight being added to the waveguide assembly which is typically undesirable in HMD applications.

Figure 26:
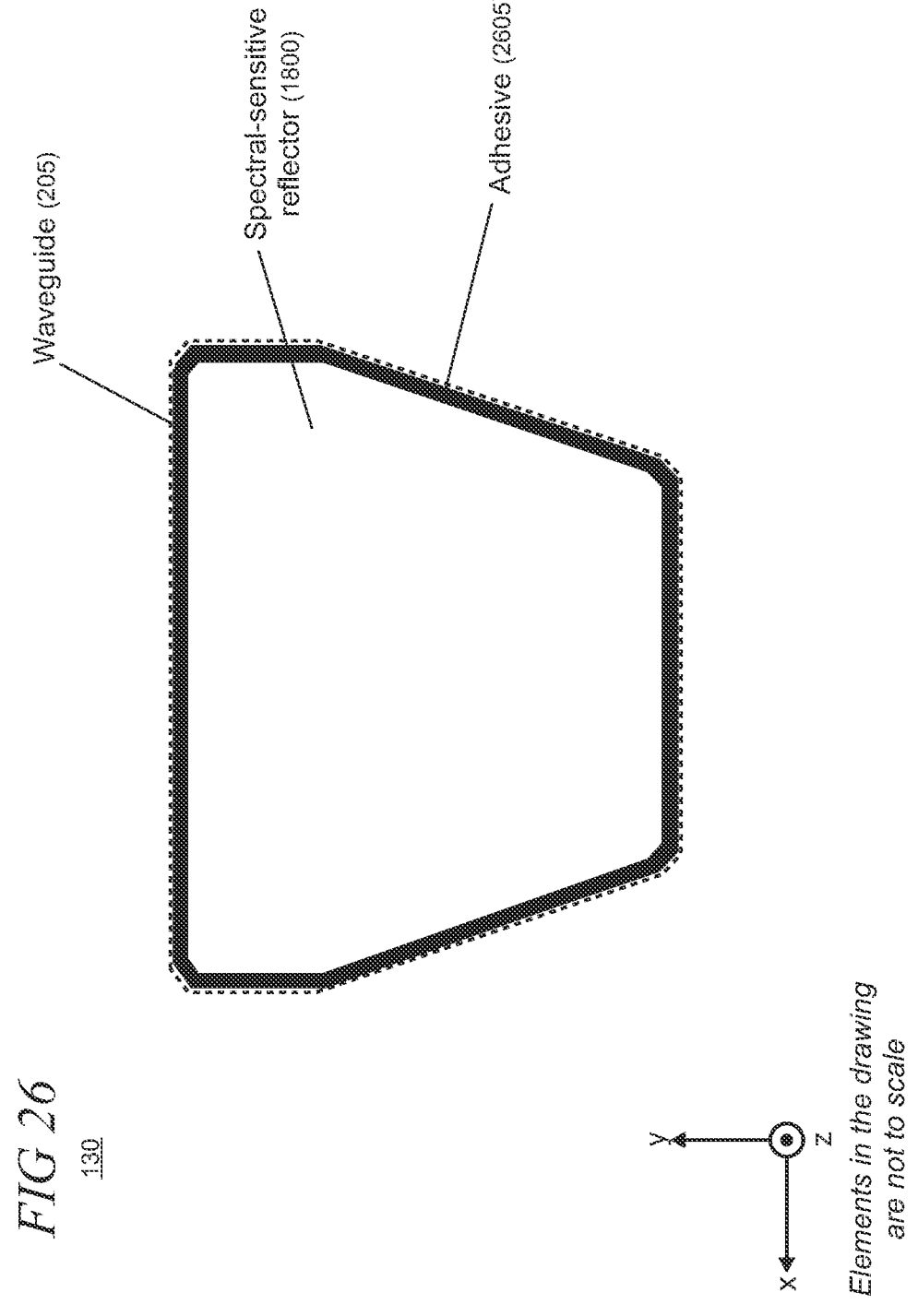
FIG. 26 is a front view of an illustrative waveguide combiner onto which a substrate supporting a spectral-sensitive reflector is bonded using an adhesive.

FIG. 26 is a front view of an illustrative waveguide combiner 130 having a backside surface onto which a substrate supporting a spectral-sensitive reflector 1800 implemented using a thin film coating is bonded using an adhesive. The spectral-sensitive reflector is typically constructed from the same or similar materials as the waveguide 205 (shown by the dashed line in the drawing), for example thin glass or plastic substrates. The spectral-sensitive reflector and waveguide may also be subjected to consistent fabrication techniques during display manufacturing so that the reflector is able to be cut and assembled with the waveguide assembly in a close-fitting manner while holding tight tolerances for flatness and alignment. For example, the spectral-sensitive reflector can be configured for spacing of approximately 50 μm to 300 μm from the waveguide.

The alignment between the spectral-sensitive reflector 1800 and waveguide 205 is facilitated by one or more structural fittings such as fasteners, clamps, and the like in some implementations. However, alignment and flatness are alternatively maintained using spacers or the like that fit in the gaps between the spectral-sensitive reflector and the waveguide. In this illustrative example, an adhesive 2605 is applied around the periphery of the substrate of the spectral-sensitive reflector to bond it to the waveguide.

The close-fitting arrangement between the spectral-sensitive reflector 1800 and waveguide 205 may be expected to minimize impact on display quality in typical applications by ensuring that the reflected virtual image light maintains coherency with the rearward propagating light. That is, maintaining flatness and alignment of the spectral-sensitive reflector with the waveguide within a predetermined tolerance may minimize ghost images and interference that can degrade the MTF of the virtual images beyond an acceptable limit.

Figure 27:
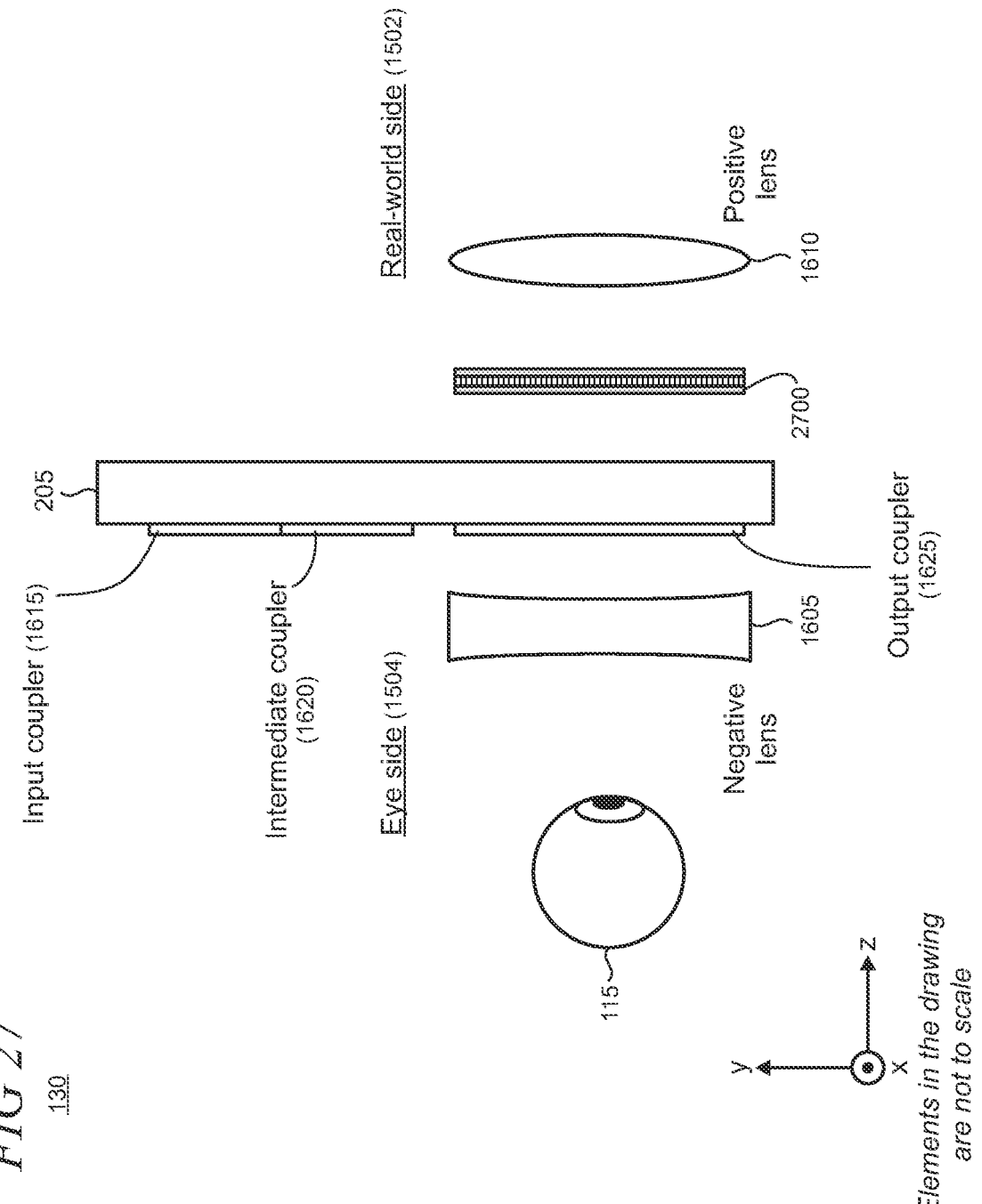
FIG. 27 is a side view of an illustrative waveguide combiner having a spectral-sensitive reflector and a light deflector.

FIG. 27 is a side view of an illustrative waveguide combiner configured as a light deflector 2700. The light deflector is located between the waveguide 205 and the positive lens 1610 in this illustrative example, as shown. As discussed above in the text accompanying FIG. 5, the light deflector is configurable as VBG or other optical component that is arranged to steer light based on angle of incidence if the so-called Bragg condition is met. Bragg gratings are typically written inside a volume of transparent material that is photosensitive such that a periodic modulation of refractive index is provided within some region of the VBG.

Figure 29:
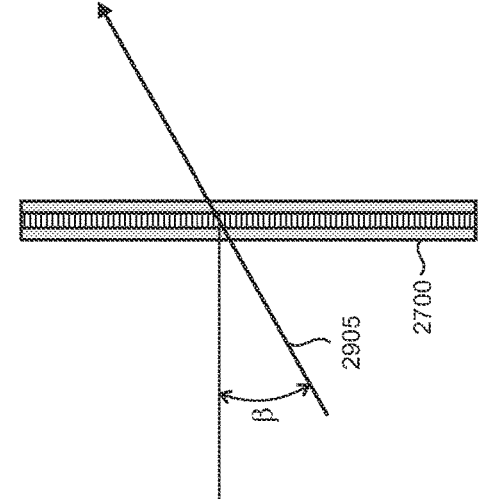
FIGS. 28, 29, and 30 show beam geometries for an illustrative volume Bragg grating (VBG)
Figure 30:
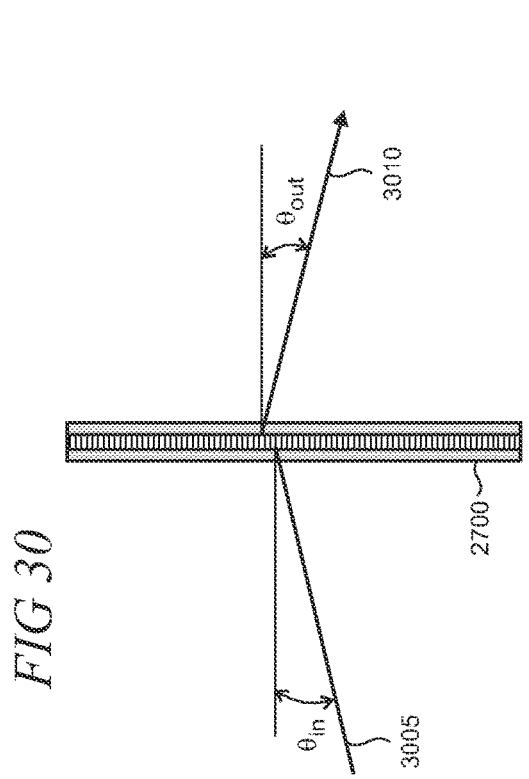
Figure 28:
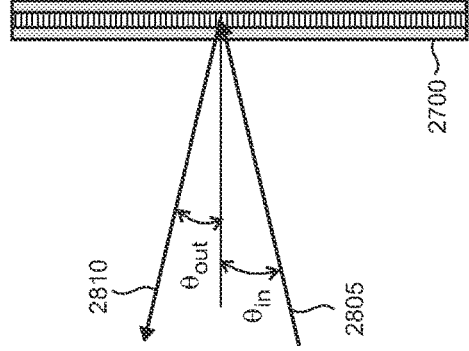

FIGS. 28, 29, and 30 show beam geometries for an illustrative light deflector 2700 that is configured as a VBG. As shown in FIG. 28, a beam 2805 incident on the light deflector at angle $\theta_{in}$ is reflected as a reflected beam 2810 at an angle $\theta_{out}$ if the Bragg condition is met. As shown in FIG. 29, for a different angle of incidence β for beam 2905, no reflection occurs. FIG. 30 shows the light deflector using a VBG as configured for transmission. Here, an incident beam 3005 at angle $\theta_{in}$ meeting the Bragg condition is transmitted as output beam 3010 with an angle $\theta_{out}$.

Figure 31:
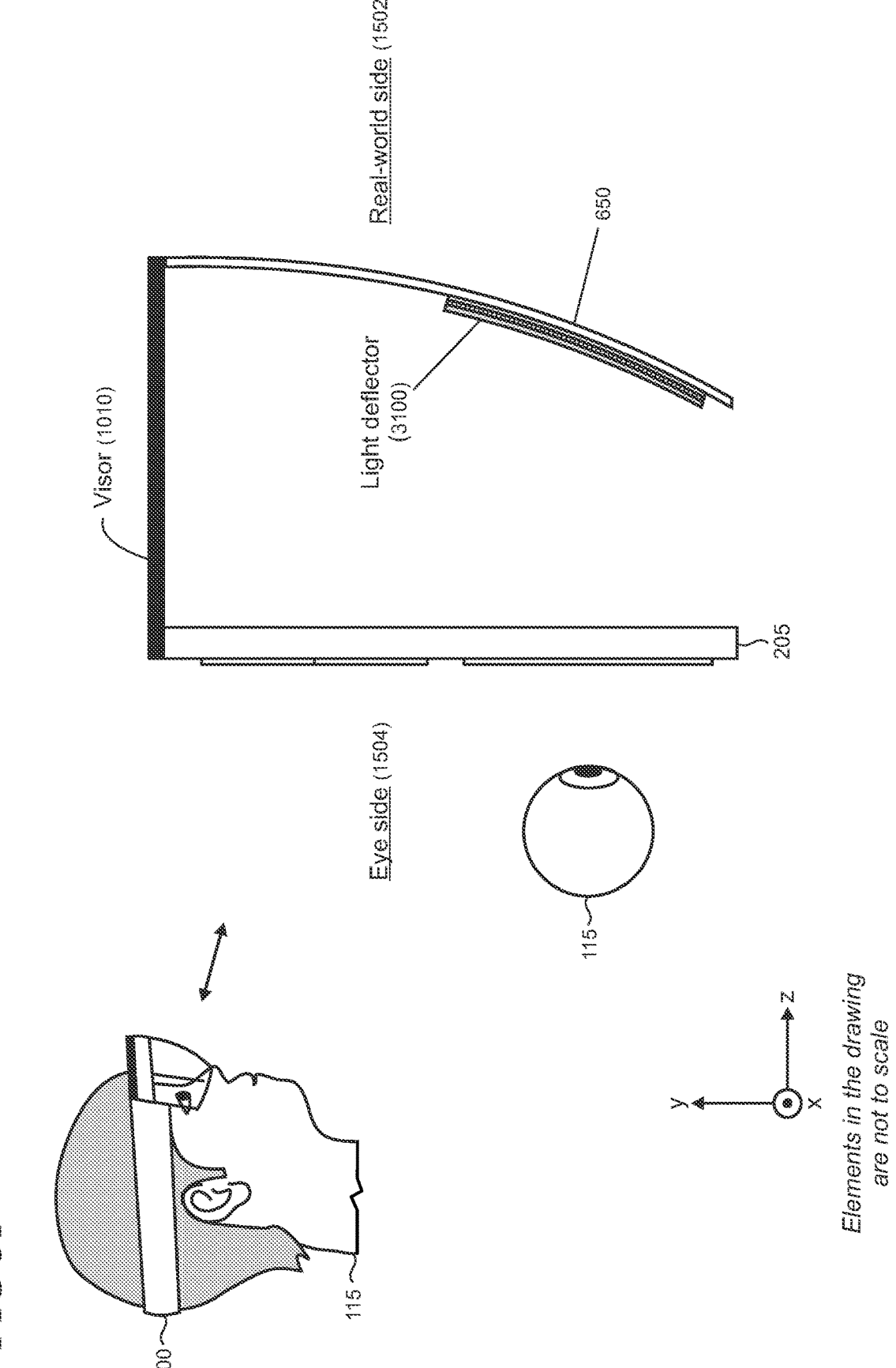
FIG. 31 is a pictorial side view of a portion of an HMD device having a curved light deflector.
Figure 33:
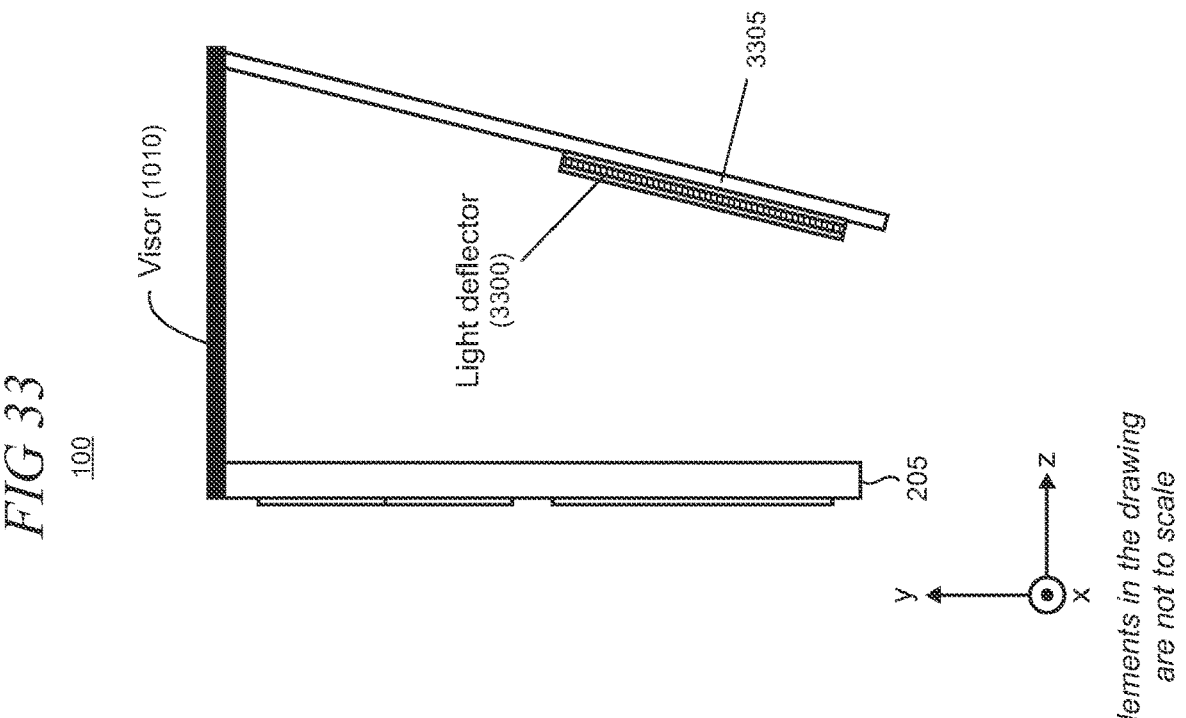
FIGS. 32 and 33 are pictorial side views of a portion of an HMD device showing alternative embodiments for a light deflector and an eye shield.
Figure 32:
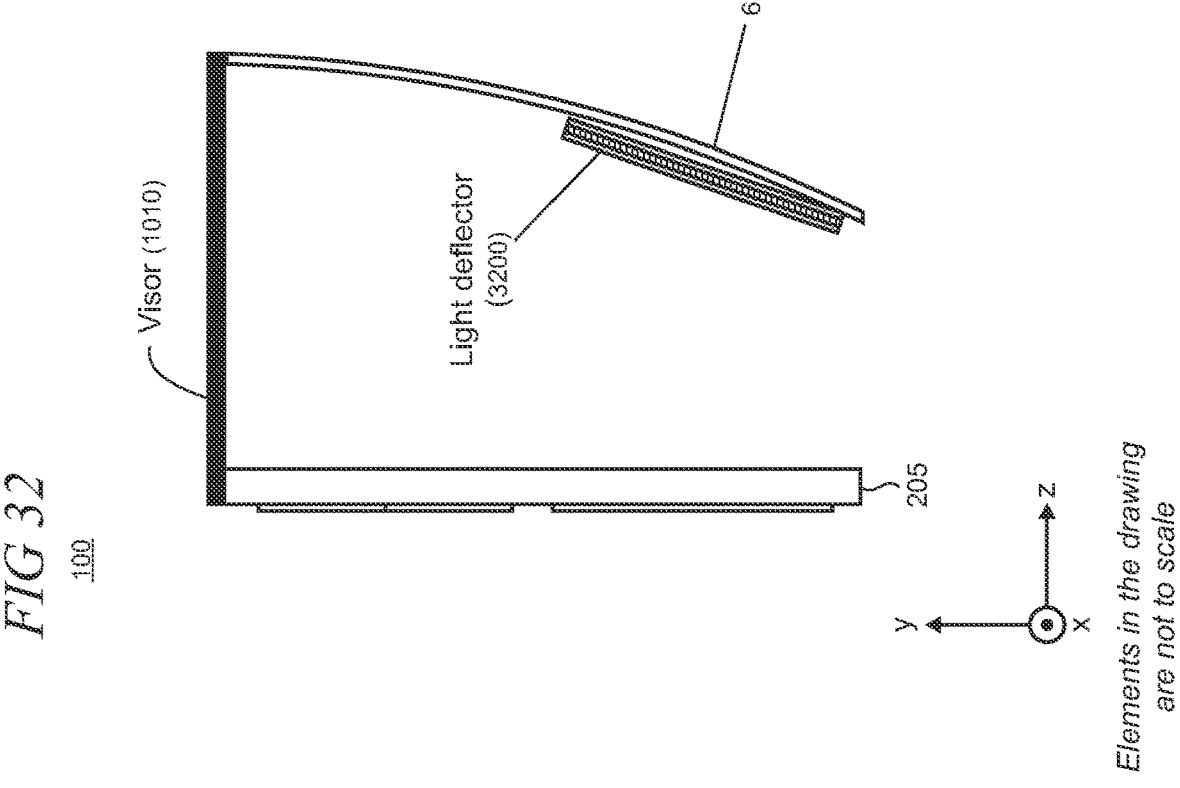

FIG. 31 is a pictorial side view of a portion of an HMD device 100 having a curved light deflector 3100 that is disposed on the eye shield 650 (FIG. 6). Alternative arrangements for the light deflector are shown in FIGS. 32 and 33. In FIG. 32, the light deflector 3200 has a planar form factor. In FIG. 33, the light deflector 3300 has a planar form factor and an eye shield 3305 has planar portions rather than being curved.

Figure 34:
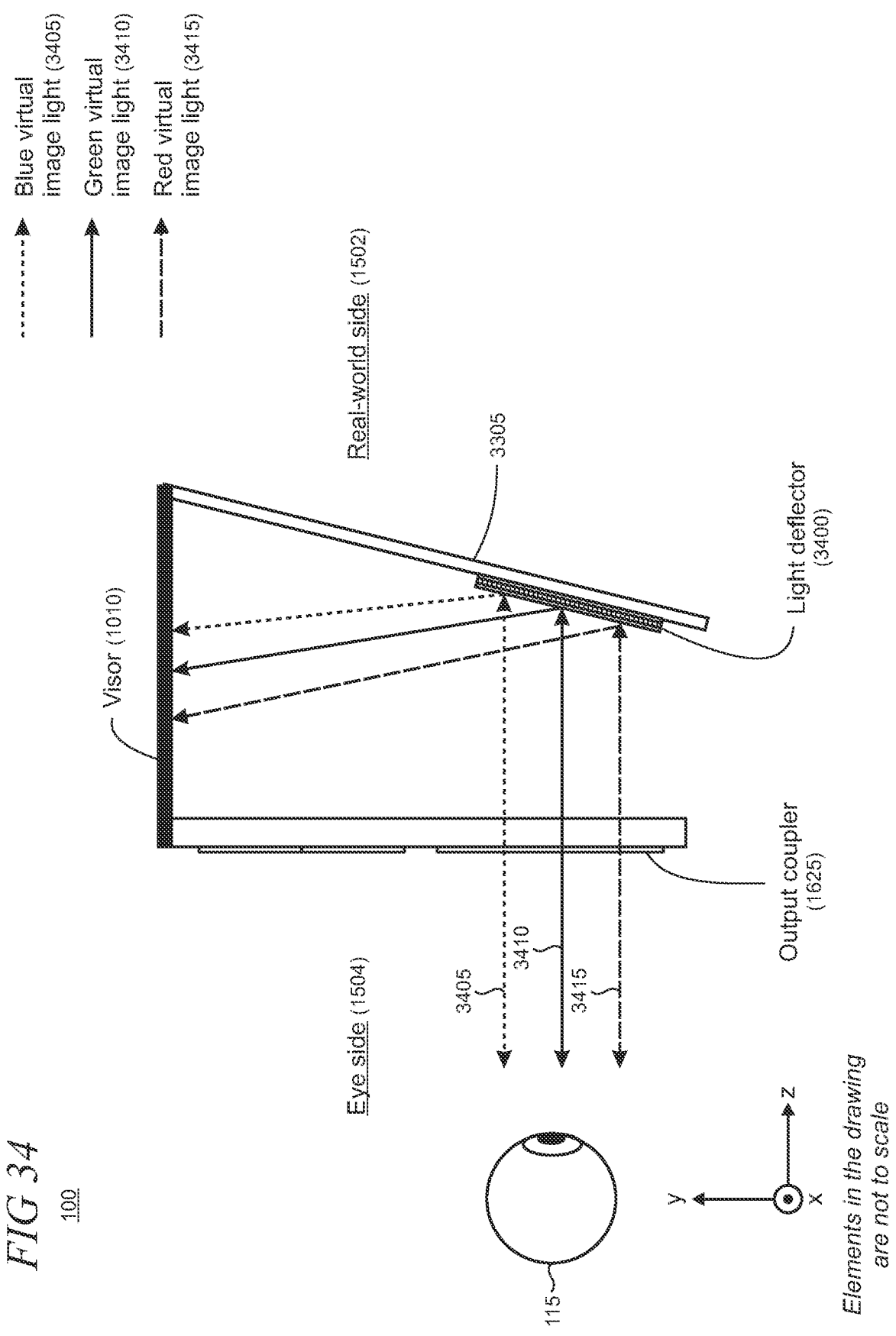
FIG. 34 is a pictorial side view of a portion of an HMD device showing an illustrative embodiment in which a light deflector is located adjacent to an eye shield and a VBG in the light deflector operates in reflection.

FIG. 34 is a pictorial side view of a portion of an HMD device 100 showing an illustrative embodiment in which a light deflector 3400 is located adjacent to the eye shield 3305 and a VBG in the light deflector operates in reflection. Each of the color components of an RGB color model, as indicated by reference numerals 3405, 3410, and 3415, are out-coupled by the output coupler 1625 in both forward and rearward directions. The forward-propagating virtual image light is incident upon the light deflector at an angle that meets the Bragg condition. The light deflector steers the virtual image light upwards by imparting an angular change in propagation direction, as shown, so that the light impinges on the visor 1010. In an illustrative example, the visor is configured to absorb or diffuse the virtual image light and thereby reduce the leakage in a forward direction.

Figure 35:
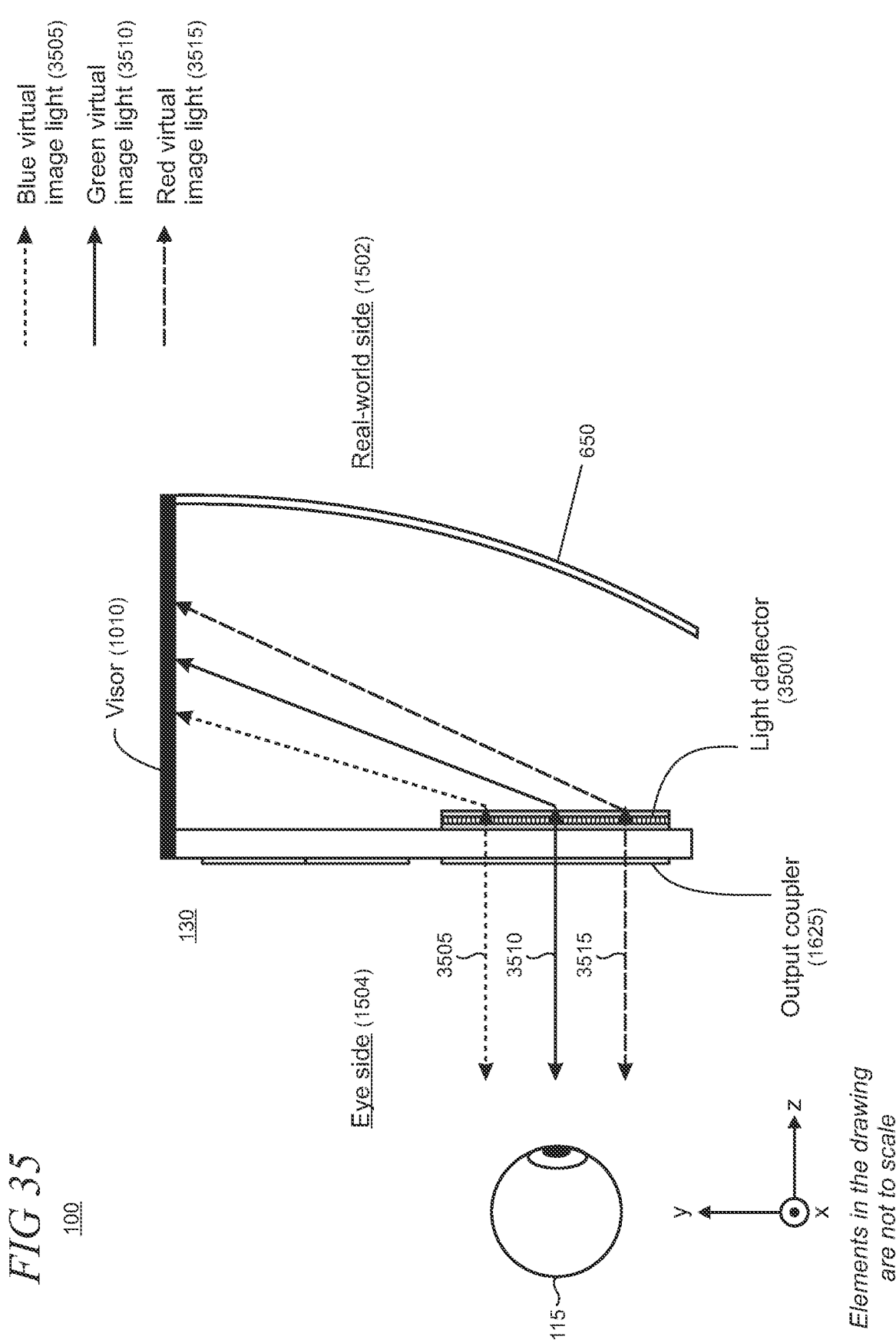
FIG. 35 is a pictorial side view of a portion of an HMD device showing an illustrative embodiment in which a light deflector is located adjacent to a waveguide combiner and a VBG in the light deflector operates in transmission.

FIG. 35 is a pictorial side view of a portion of an HMD device 100 showing an illustrative embodiment in which a light deflector 3500 is located adjacent to the waveguide combiner 130. A VBG in the light deflector operates in transmission in this illustrative example. Each of the color components of an RGB color model, as indicated by reference numerals 3505, 3510, and 3515, are out-coupled by the output coupler 1625 in both forward and rearward directions. The forward-propagating virtual image light is incident upon the light deflector at an angle that meets the Bragg condition. The light deflector steers the virtual image light upwards by imparting an angular change in propagation direction, as shown, so that the light impinges on the visor 1010 which absorbs or diffuses the forward-propagating virtual image light.

Figure 36:
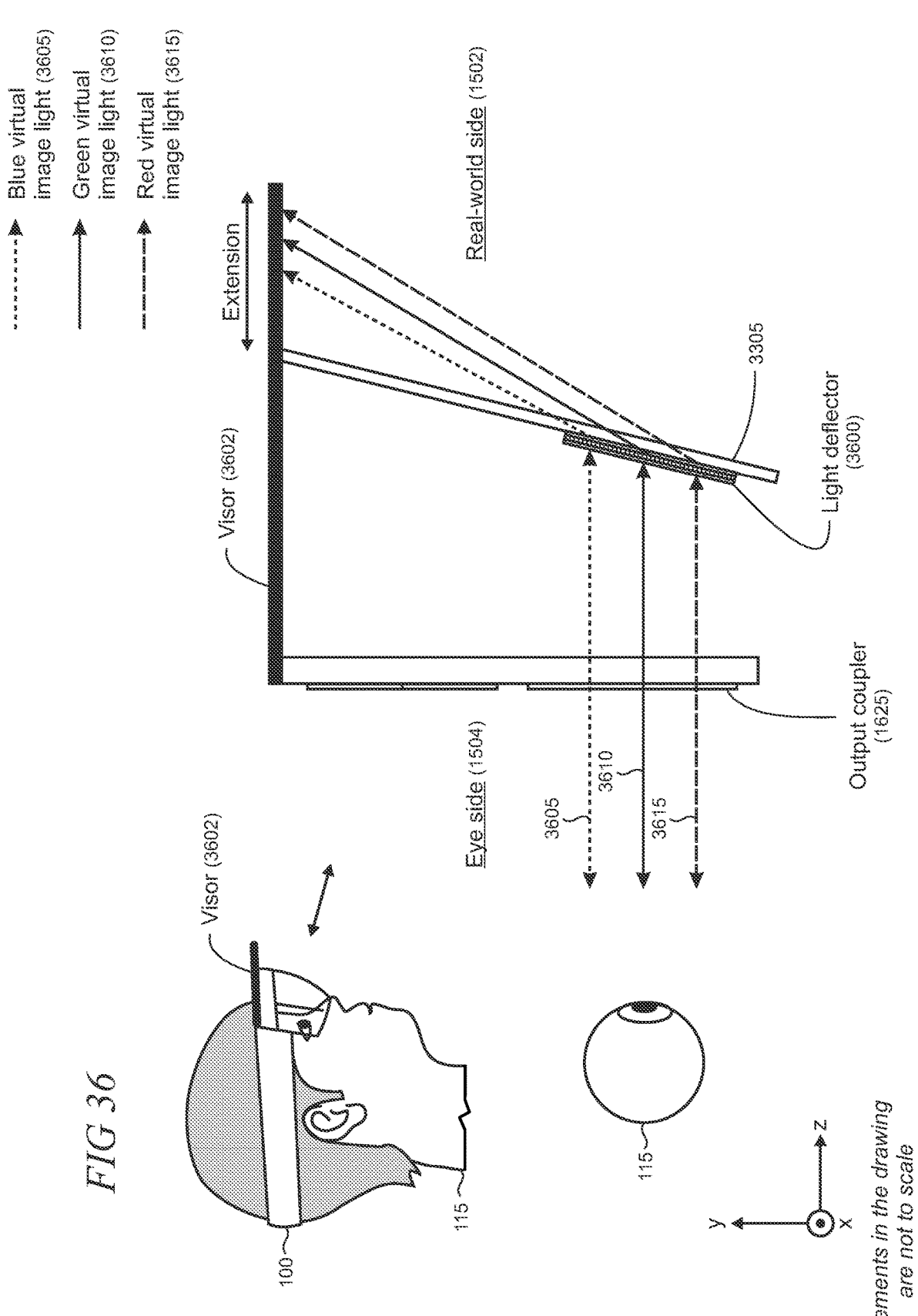
FIG. 36 is a pictorial side view of a portion of an HMD device showing an illustrative embodiment in which a light deflector is located adjacent to an eye shield and a VBG in the light deflector operates in transmission.

FIG. 36 is a pictorial side view of a portion of an HMD device 100 showing an illustrative embodiment in which a light deflector 3600 is located adjacent to the eye shield 3305 and a VBG in the light deflector operates in transmission. Each of the color components of an RGB color model, as indicated by reference numerals 3605, 3610, and 3615, are out-coupled by the output coupler 1625 in both forward and rearward directions. The forward-propagating virtual image light is incident upon the light deflector 3600 at an angle that meets the Bragg condition. The light deflector steers the virtual image light upwards by imparting an angular change in propagation direction, as shown, so that the light impinges on the visor 3602 which absorbs or diffuses the forward-propagating virtual image light. In this illustrative example, the visor is configured with a lateral extension to project beyond the eye shield.

FIG. 37 is a pictorial side view of a portion of an HMD device 100 showing an illustrative embodiment in which a spectral-sensitive reflector 1800 is located adjacent to a waveguide combiner 130 and a light deflector 3700 is located adjacent to the eye shield 650 (FIG. 6). A VBG in the light deflector operates in reflection in this illustrative example. The spectral-sensitive reflector is configured to reflect the green component of virtual image light 3705 while the VBG in the light deflector is tuned to reflect the red component when meeting the Bragg condition.

As shown, the output coupler 1625 out-couples the virtual image light in both forward and rearward directions. The forward-propagating green virtual image light is reflected back to the user 115 by the spectral-sensitive reflector 1800. The forward-propagating red virtual image light is steered upwards by the light deflector to be absorbed or diffused by the visor 1010.

FIG. 38 is a flowchart 3800 of an illustrative method for reducing light leakage in an optical display system configured to display virtual images in a mixed-reality usage scenario in which virtual images are seen by a user as superimposed over a physical real-world environment. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps are optionally utilized.

Block 3805 includes providing a see-through waveguide combiner comprising at least one transparent waveguide having a first surface towards which a user of the waveguide combiner looks to view the real-world environment, and a second surface opposite the first surface, in which an input coupler and an output coupler are disposed on the waveguide.

Block 3810 includes configuring the waveguide combiner with a spectral-sensitive reflector on the second surface of the waveguide, the spectral-sensitive reflector reflecting forward-propagating virtual image light that is leaking from the waveguide combiner towards an eye of the user.

Block 3815 includes configuring the waveguide combiner with a light deflector disposed along a forward-propagating light path extending from the output coupler of the waveguide combiner towards the real-world environment, wherein the light deflector steers forward-propagating virtual image light that is leaking from the waveguide combiner to impart an angular change in propagation direction of the virtual image light.

The waveguide combiner with reduced light leakage may be utilized in HMD devices having a variety of form factors and features. FIG. 39 shows one particular illustrative example of a mixed-reality HMD device 3900, and FIG. 40 shows a functional block diagram of the device 3900. The HMD device comprises one or more lenses 3902 that form a part of a see-through display system 105, so that images are displayed using lenses 3902 (e.g., using projection onto lenses 3902, one or more waveguide systems, such as a near-eye display system, incorporated into the lenses 3902, and/or in any other suitable manner).

The HMD device 3900 further comprises one or more outward-facing image sensors 3906 configured to acquire images of a background scene and/or physical environment being viewed by a user and includes one or more microphones 3908 configured to detect sounds, such as voice commands from a user. Outward-facing image sensors 3906 include one or more depth sensors and/or one or more two-dimensional image sensors. In alternative arrangements, as noted above, a mixed-reality or virtual-reality display system, instead of incorporating a see-through display system, displays mixed-reality or virtual-reality images through a viewfinder mode for an outward-facing image sensor.

The HMD device 3900 further includes a eye tracking system 3910 configured for detecting a direction of gaze of each eye of a user or a direction or location of focus, as described above. The eye tracking system is configured to determine gaze directions of each of a user's eyes in any suitable manner. For example, in the illustrative example shown, the eye tracking system includes one or more glint sources 3912, such as infrared light sources, that are configured to cause a glint of light to reflect from each eyeball of a user, and one or more image sensors 3914, such as inward-facing sensors, that are configured to capture an image of each eyeball of the user. Changes in the glints from the user's eyeballs and/or a location of a user's pupil, as determined from image data gathered using the image sensor(s) 3914, are used to determine a direction of gaze.

In addition, a location at which gaze lines projected from the user's eyes intersect the external display is used to determine an object at which the user is gazing (e.g., a displayed virtual object and/or real background object). The eye tracking system 3910 has any suitable number and arrangement of light sources and image sensors. In some implementations, the eye tracking system may be omitted.

The HMD device 3900 also includes additional sensors in some embodiments. For example, HMD device 3900 includes a global positioning system (GPS) system 3916 to allow a location of the HMD device 3900 to be determined. This may help to identify real-world objects, such as buildings, etc., that are located in the user's adjoining physical environment.

The HMD device 3900 further includes one or more motion sensors 3918 (e.g., inertial, multi-axis gyroscopic, or acceleration sensors) to detect movement and position/orientation/pose of a user's head when the user is wearing the system as part of a mixed reality or virtual reality HMD device. Motion data is usable, potentially along with eye-tracking glint data and outward-facing image data, for gaze detection, as well as for image stabilization to help correct for blur in images from the outward-facing image sensor(s) 3906. The use of motion data allows changes in gaze direction to be tracked even if image data from outward-facing image sensor(s) 3906 cannot be resolved.

In addition, motion sensors 3918, as well as microphone(s) 3908 and eye tracking system 3910, are employable as user input devices, such that a user interacts with the HMD device 3900 via gestures of the eye, neck and/or head, as well as via verbal commands in some cases. It may be understood that sensors illustrated in FIGS. 39 and 40 and described in the accompanying text are included for the purpose of example and are not intended to be limiting in any manner, as any other suitable sensors and/or combination of sensors are utilizable to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) are utilizable in some implementations.

The HMD device 3900 further includes a controller 3920 such as one or more processors having a logic system 3922 and a data storage system 3924 in communication with the sensors, eye tracking system 3910, display system 3904, and/or other components through a communications system 3926. The communications system 3926 facilitates the display system being operated in conjunction with remotely located resources, such as processing, storage, power, data, and services. That is, in some implementations, an HMD device is operable as part of a system that distributes resources and capabilities among different components and systems.

The storage system 3924 includes instructions stored thereon that are executable by logic system 3922, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 3900 is configured with one or more audio transducers 3928 (e.g., speakers, earphones, etc.) so that audio can be utilized as part of a mixed-reality or virtual-reality experience. A power management system 3930 includes one or more batteries 3932 and/or protection circuit modules (PCMs) and an associated charger interface 3934 and/or remote power interface for supplying power to components in the HMD device 3900.

It may be appreciated that the HMD device 3900 is described for the purpose of example, and thus is not meant to be limiting. It may be further understood that the display system includes, in some embodiments, additional and/or alternative sensors, cameras, microphones, input devices, output devices, etc., than those shown without departing from the scope of the present arrangement. Additionally, the physical configuration of an HMD device and its various sensors and subcomponents may take a variety of different forms without departing from the scope of the present arrangement.

FIG. 41 schematically shows an illustrative example of a computing system 4100 that can enact one or more of the systems, features, functions, methods and/or processes described above for the present waveguide combiner with reduced light leakage. The computing system is shown in simplified form. The computing system generally takes the form of one or more personal computers, server computers, tablet computers, home-entertainment computers, network computing devices, gaming devices, mobile computing devices, mobile communication devices (e.g., smartphone), wearable computers, and/or other computing devices.

The computing system 4100 includes a logic processor 4102, a volatile memory 4104, and a non-volatile storage device 4106. The computing system optionally includes a display system 4108, input system 4110, communication system 4112, and/or other components not shown in FIG. 41.

The logic processor 4102 includes one or more physical devices configured to execute instructions. For example, the logic processor is configurable to execute instructions that are part of one or more applications, services, programs, routines, libraries, objects, components, data structures, or other logical constructs. Such instructions are typically implemented to perform a task, implement a data type, transform the state of one or more components, achieve a technical effect, or otherwise arrive at a desired result.

The logic processor 4102 includes one or more processors configured to execute software instructions. In addition, or alternatively, the logic processor includes one or more hardware or firmware logic processors configured to execute hardware or firmware instructions. Processors of the logic processor are alternatively configured as single-core or multi-core, and the instructions executed thereon are configurable for sequential, parallel, and/or distributed processing. Individual components of the logic processor are optionally distributed among two or more separate devices, which may be remotely located and/or configured for coordinated processing. Aspects of the logic processor are virtualized and executed by remotely accessible, networked computing devices configured in a cloud-computing configuration. In such a case, these virtualized aspects are run on different physical logic processors of various different machines.

The non-volatile storage device 4106 includes one or more physical devices configured to hold instructions executable by the logic processors to implement the methods and processes described herein. When such methods and processes are implemented, the state of the non-volatile storage device may be transformed—e.g., to hold different data.

The non-volatile storage device 4106 includes physical devices that are removable and/or built-in. The non-volatile storage device includes optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. The non-volatile storage device includes non-volatile, dynamic, static, read/write, read-only, sequential-access, location-addressable, file-addressable, and/or content-addressable devices. It will be appreciated that the non-volatile storage device is configured to hold instructions even when power is cut to the non-volatile storage device.

The volatile memory 4104 includes physical devices that include random access memory. The volatile memory is typically utilized by the logic processor 4102 to temporarily store information during processing of software instructions. It will be appreciated that the volatile memory typically does not continue to store instructions when power is cut to the volatile memory.

Aspects of logic processor 4102, volatile memory 4104, and non-volatile storage device 4106 are capable of integration into one or more hardware-logic components. Such hardware-logic components include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" is typically used to describe an aspect of computing system 4100 implemented in software by a processor to perform a particular function using portions of volatile memory, which function involves transformative processing that specially configures the processor to perform the function. Thus, a program is instantiated via the logic processor 4102 executing instructions held by the non-volatile storage device 4106, using portions of the volatile memory 4104. It will be understood that different programs are instantiated from the same application, service, code block, object, library, routine, API (application programming interface), function, etc. Likewise, the same program is instantiated by different applications, services, code blocks, objects, routines, APIs, functions, etc. A program encompasses individual or groups of executable files, data files, libraries, drivers, scripts, database records, etc.

The display system 4108, when included, is usable to present a visual representation of data held by the non-volatile storage device 4106. This visual representation may take the form of a graphical user interface (GUI). As the herein described methods and processes change the data held by the non-volatile storage device, and thus transform the state of the non-volatile storage device, the state of the display system 4108 is likewise transformed to visually represent changes in the underlying data. The display system includes one or more display devices utilizing virtually any type of technology; however, one utilizing a MEMS projector to direct laser light may be compatible with the eye-tracking system in a compact manner. Such display devices are combinable with the logic processor 4102, volatile memory 4104, and/or non-volatile storage device 4106 in a shared enclosure, or such display devices include peripheral display devices.

The input system 4110, when included, comprises or interfaces with one or more user-input devices such as a keyboard, mouse, touch screen, or game controller. In some embodiments, the input system comprises or interfaces with selected natural user input (NUI) componentry. Such componentry is integrated or peripheral, and the transduction and/or processing of input actions is handled on- or off-board. Example NUI componentry include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The communication system 4112, when included, is configured to communicatively couple various computing devices described herein with each other, and with other devices. The communication system includes wired and/or wireless communication devices compatible with one or more different communication protocols. As non-limiting examples, the communication system is configurable for communication via a wireless telephone network, or a wired or wireless local- or wide-area network. In some embodiments, the communication system allows computing system 4100 to send and/or receive messages to and/or from other devices via a network such as the Internet.

Various exemplary embodiments of the present waveguide combiner with reduced light leakage are now presented by way of illustration and not as an exhaustive list of all embodiments. An example includes a waveguide combiner usable in a mixed-reality environment in which virtual images are displayed by the waveguide combiner over a user's views of a real world, comprising: a see-through waveguide through which the user views the real world, the waveguide having a frontside surface facing an eye of the user and a backside surface facing the real world; an input coupler disposed on the waveguide configured to in-couple virtual images generated by a display engine into the waveguide; an output coupler disposed on the waveguide configured to out-couple virtual images from the waveguide to the eye of the user; and a spectral-sensitive reflector disposed on the backside surface of the waveguide and located along a forward-propagating light path extending from the output coupler of the waveguide combiner towards the real world, wherein the spectral-sensitive reflector reflects forward-propagating light out-coupled from the output coupler back towards the eye of the user.

In another example, the display engine outputs monochromatic virtual image light, and the spectral-sensitive reflector comprises a single notch filter having a bandpass matching the display engine output. In another example, the display engine outputs virtual image light according to an RGB (red, green, blue) color model, and the spectral-sensitive reflector comprises a triple notch filter having a bandpass matching the display engine output. In another example, the spectral-sensitive reflector comprises a thin film reflective coating that is disposed on a substrate as alternating layers of dielectric materials each having a different index of refraction.

In another example, the dielectric materials comprise one of silicon dioxide (SiO2), titanium dioxide (TiO2), or aluminum oxide (Al2O3). In another example, the substrate and waveguide are coupled with an adhesive applied around a periphery of the substrate to maintain a uniform parallel gap between a plane of the substrate and a plane of the waveguide within a predetermined threshold. In another example, the display engine generates polychromatic virtual images based on a color model and the waveguide combiner comprises a single plate that propagates all colors of the color model.

A further example includes a head-mounted display (HMD) device wearable by a user and supporting a mixed-reality experience comprising a display of virtual images for objects in a virtual world and real-world images for objects in a real world, comprising: a display engine generating light for the virtual images; a waveguide combiner comprising a see-through waveguide having an eye-facing side and a real-world-facing side, an input coupler disposed on the waveguide configured for in-coupling the virtual image light from the display engine into the waveguide, and an output coupler disposed on the waveguide for out-coupling the virtual images from the waveguide to an eye of the user, wherein the waveguide combiner includes a see-through portion, located on the HMD device in front of the eye of the user when the HMD device is donned, through which the user views the real world; and a light deflector disposed along a forward-propagating light path extending from the output coupler of the waveguide combiner towards the real world, wherein the light deflector steers forward-propagating virtual image light to impart an angular change in propagation direction of the virtual image light.

In another example, the HMD device further comprises an intermediate coupler in which the input coupler receives virtual image light generated by the display engine having an entrance pupil and the waveguide combiner is configured as an exit pupil expander to provide an exit pupil for virtual images that is expanded in two directions relative to the entrance pupil, wherein the intermediate coupler performs exit pupil expansion in a first direction and the output coupler performs exit pupil expansion in a second direction. In another example, the display engine generates polychromatic virtual images based on a color model and the waveguide combiner comprises a single plate that propagates all colors of the color model. In another example, the HMD device further comprises a second see-through waveguide and a third see-through waveguide, each of the see-through waveguides having corresponding input couplers and outcouplers and being configured in a stack wherein each see-through waveguide in the waveguide combiner propagates one or more optical beams for the virtual images for a different component of a polychromatic color model. In another example, the light deflector comprises one of volume Bragg grating (VBG), liquid-crystal Bragg grating, or one or more arrays of partial mirrors embedded in an optical substrate. In another example, the HMD device further comprises a transparent eye shield and the light deflector is located on the eye shield. In another example, the HMD device further comprises a laterally extending visor that is disposed on the HMD device above the eye shield in an as-worn orientation, wherein the angular change in propagation direction of the virtual image light causes the forward-propagating virtual image light to be steered into the visor. In another example, the visor includes one of light absorber or light diffuser. In another example, the light deflector is planar or curved. In another example, the angular change in propagation direction of forward-propagating virtual image light shifts the virtual images to prevent overlay of the virtual images with the user's eyes responsively to the forward-propagating virtual image light being seen by an observer of the HMD device user.

A further example includes a method for reducing light leakage in an optical display system configured to display virtual images in a mixed-reality usage scenario in which virtual images are seen by a user as superimposed over a physical real-world environment, comprising: providing a see-through waveguide combiner comprising at least one transparent waveguide having a first surface towards which a user of the waveguide combiner looks to view the real-world environment, and a second surface opposite the first surface, in which an input coupler and an output coupler are disposed on the waveguide; configuring the waveguide combiner with a spectral-sensitive reflector on the second surface of the waveguide, the spectral-sensitive reflector reflecting forward-propagating virtual image light that is leaking from the waveguide combiner towards an eye of the user; and configuring the waveguide combiner with a light deflector disposed along a forward-propagating light path extending from the output coupler of the waveguide combiner towards the real-world environment, wherein the light deflector steers forward-propagating virtual image light that is leaking from the waveguide combiner to impart an angular change in propagation direction of the virtual image light.

In another example, the light deflector is disposed along the forward-propagating light path downstream from, and adjacent to, the spectral-sensitive reflector. In another example, the method further comprises providing a conjugate pair of lenses comprising a negative lens and a positive lens that are respectively disposed on opposite sides of the waveguide combiner, and in which the light deflector is disposed along the forward-propagating light path downstream from, and adjacent to the positive lens.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A device comprising:
a waveguide combiner usable in a mixed-reality environment in which virtual images are displayed by the waveguide combiner over a user's views of a real world, including
a see-through waveguide through which the user views the real world, the waveguide having a frontside surface facing an eye of the user and a backside surface facing the real world;
an input coupler disposed on the waveguide configured to in-couple the virtual images which are generated by a display engine into the waveguide;
an output coupler disposed on the waveguide configured to out-couple the virtual images from the waveguide to the eye of the user; and
a spectral-sensitive reflector disposed on the backside surface of the waveguide and located along a forward-propagating light path extending from the output coupler of the waveguide combiner towards the real world, wherein the spectral-sensitive reflector reflects forward-propagating light out-coupled from the output coupler back towards the eye of the user; and
a light deflector that steers forward-propagating virtual image light that is leaking from the waveguide combiner by imparting an angular change in a propagation direction of the virtual image light to change the propagation direction to be away from the eye of the user towards a visor.

2. The device of claim 1 in which the display engine outputs monochromatic virtual image light, and the spectral-sensitive reflector comprises a single-notch filter having a bandpass matching an output of the display engine.

3. The device of claim 1 in which the display engine outputs virtual image light according to an RGB (red, green, blue) color model, and the spectral-sensitive reflector comprises a triple-notch filter having a bandpass matching the output of the display engine.

4. The device of claim 1 in which the spectral-sensitive reflector comprises a thin film reflective coating that is disposed on a substrate as alternating layers of dielectric materials each having a different index of refraction.

5. The device of claim 4 in which the dielectric materials comprise one of silicon dioxide ($SiO_2$), titanium dioxide ($TiO_2$), or aluminum oxide ($Al_2O_3$).

6. The device of claim 4 in which the substrate and the waveguide are coupled with an adhesive applied around a periphery of the substrate to maintain a uniform parallel gap between a plane of the substrate and a plane of the waveguide within a predetermined threshold.

7. The device of claim 1 in which the display engine generates polychromatic virtual images based on a color model, the waveguide combiner comprises a single plate that propagates all colors of the color model,
wherein the light deflector is disposed along the forward-propagating light path,
wherein the light deflector is located on a transparent eye shield, and
further wherein the visor is a laterally extending visor above the eye shield in an as-worn orientation, wherein the angular change in the propagation direction of the virtual image light causes the forward-propagating virtual image light to be steered into the visor.

8. A head-mounted display (HMD) device wearable by a user and supporting a mixed-reality experience comprising a display of virtual images for objects in a virtual world and real-world images for objects in a real world, comprising:
a visor;
a display engine generating virtual image light for the virtual images;
a waveguide combiner comprising a see-through waveguide having an eye-facing side and a real-world-facing side, an input coupler disposed on the waveguide configured for in-coupling the virtual image light from the display engine into the waveguide, and an output coupler disposed on the waveguide for out-coupling the virtual images from the waveguide to an eye of the user, wherein the waveguide combiner includes a see-through portion, located on the HMD device in front of the eye of the user when the HMD device is donned, through which the user views the real world; and
a light deflector disposed along a forward-propagating light path extending from the output coupler of the waveguide combiner towards the real world, wherein the light deflector steers forward-propagating virtual image light to impart an angular change in a propagation direction of the virtual image light to change the propagation direction to be away from the eye of the user towards the visor.

9. The HMD device of claim 8 further comprising an intermediate coupler in which the input coupler receives virtual image light generated by the display engine having an entrance pupil and the waveguide combiner is configured as an exit pupil expander to provide an exit pupil for virtual images that is expanded in two directions relative to the entrance pupil, wherein the intermediate coupler performs exit pupil expansion in a first direction and the output coupler performs exit pupil expansion in a second direction.

10. The HMD device of claim 8 in which the display engine generates polychromatic virtual images based on a color model and the waveguide combiner comprises a single plate that propagates all colors of the color model.

11. The HMD device of claim 8 further comprising a second see-through waveguide and a third see-through waveguide, each of the see-through waveguides having corresponding input couplers and out-couplers and being configured in a stack wherein each see-through waveguide in the waveguide combiner propagates one or more optical beams for the virtual images for a different component of a polychromatic color model.

12. The HMD device of claim 8 in which the light deflector comprises one of volume Bragg grating (VBG), liquid-crystal Bragg grating, or one or more arrays of partial mirrors embedded in an optical substrate.

13. The HMD device of claim 8 further comprising a transparent eye shield and in which the light deflector is located on the eye shield.

14. The HMD device of claim 13 wherein the visor is laterally extending and is disposed on the HMD device above the eye shield in an as-worn orientation, wherein the angular change in the propagation direction of the virtual image light causes the forward-propagating virtual image light to be steered into the visor.

15. The HMD device of claim 14 in which the visor includes one of light absorber or light diffuser.

16. The HMD device of claim 8 in which the light deflector is planar or curved.

17. The HMD device of claim 8 in which the angular change in the propagation direction of forward-propagating virtual image light shifts the virtual images to prevent overlay of the virtual images with the user's eyes responsively to the forward-propagating virtual image light being seen by an observer of the HMD device user.

18. A method for reducing light leakage in an optical display system configured to display virtual images in a mixed-reality usage scenario in which the virtual images are seen by a user as superimposed over a physical real-world environment, comprising:

providing a see-through waveguide combiner comprising at least one transparent waveguide having a first surface towards which a user of the waveguide combiner looks to view the real-world environment, and a second surface opposite the first surface, in which an input coupler and an output coupler are disposed on the waveguide;

configuring the waveguide combiner with a spectral-sensitive reflector on the first surface of the waveguide, the spectral-sensitive reflector reflecting forward-propagating virtual image light that is leaking from the waveguide combiner towards an eye of the user; and configuring the waveguide combiner with a light deflector disposed along a forward-propagating light path extending from the output coupler of the waveguide combiner towards the real-world environment, wherein the light deflector steers forward-propagating virtual image light that is leaking from the waveguide combiner to impart an angular change in a propagation direction of the virtual image light to change the propagation direction to be away from the eye of the user towards a visor.

19. The method of claim 18 in which the light deflector is disposed along the forward-propagating light path downstream from, and adjacent to, the spectral-sensitive reflector wherein the light deflector is disposed along the forward-propagating light path, further wherein the light deflector is located on a transparent eye shield, and further wherein the visor is a laterally extending visor above the eye shield in an as-worn orientation, wherein the angular change in the propagation direction of the virtual image light causes the forward-propagating virtual image light to be steered into the visor.

20. The method of claim 18 further comprising providing a conjugate pair of lenses comprising a negative lens and a positive lens that are respectively disposed on opposite sides of the waveguide combiner, and in which the light deflector is disposed along the forward-propagating light path downstream from, and adjacent to, the positive lens.

* * * * *